US009062177B2

(12) United States Patent
Takase et al.

(10) Patent No.: US 9,062,177 B2
(45) Date of Patent: Jun. 23, 2015

(54) AGENT FOR IMPARTING IMPACT RESISTANCE TO POLYLACTIC ACID RESIN

(75) Inventors: Yoshihiko Takase, Yokkaichi (JP); Naoki Kondo, Yokkaichi (JP); Mikio Doi, Yokkaichi (JP); Hiroya Kuroda, Yokkaichi (JP); Mami Nanami, Yokkaichi (JP); Masaki Harada, Nagoya (JP); Kouji Iida, Nagoya (JP); Kazunori Nakano, Nagoya (JP); Hideki Hayashi, Nagoya (JP); Kazuaki Okamoto, Nagoya (JP)

(73) Assignees: TAIYO KAGAKU CO., LTD., Yokkaichi-Shi (JP); CITY OF NAGOYA, Nagoya-Shi (JP)

( * ) Notice: Subject to any disclaimer, the term of this patent is extended or adjusted under 35 U.S.C. 154(b) by 0 days.

(21) Appl. No.: 14/239,465

(22) PCT Filed: Aug. 18, 2011

(86) PCT No.: PCT/JP2011/068713
§ 371 (c)(1),
(2), (4) Date: Feb. 18, 2014

(87) PCT Pub. No.: WO2013/024554
PCT Pub. Date: Feb. 21, 2013

(65) Prior Publication Data
US 2014/0206804 A1 Jul. 24, 2014

(51) Int. Cl.
*C08K 5/00* (2006.01)
*C08K 5/09* (2006.01)
*C08K 5/103* (2006.01)
*C08L 67/04* (2006.01)
*C08K 5/06* (2006.01)
(52) U.S. Cl.
CPC . *C08K 5/09* (2013.01); *C08K 5/103* (2013.01); *C08L 67/04* (2013.01); *C08K 5/06* (2013.01)
(58) Field of Classification Search
USPC ........................................................ 524/284
See application file for complete search history.

(56) References Cited

U.S. PATENT DOCUMENTS

2003/0083440 A1   5/2003   Sashida et al.

FOREIGN PATENT DOCUMENTS

| JP | 4-335060 A | 11/1992 |
|---|---|---|
| JP | 9-111107 A | 4/1997 |
| JP | 2000-219813 A | 8/2000 |
| JP | 2003-73532 A | 3/2003 |
| JP | 2003-268088 A | 9/2003 |
| JP | 2004-359892 A | 12/2004 |
| JP | 2007-246623 A | 9/2007 |
| JP | 2007-246624 A | 9/2007 |
| JP | 3972615 B2 | 9/2007 |
| JP | 2008-69299 A | 3/2008 |
| JP | 2008069299 * | 3/2008 |
| JP | 2009-242520 A | 10/2009 |
| JP | 2010-59279 A | 3/2010 |
| JP | 2010-260900 A | 11/2010 |
| JP | 2011-89084 A | 5/2011 |
| JP | 2011089084 * | 6/2011 |

OTHER PUBLICATIONS

Translation of JP2011-089084, May 6, 2011.*
Translation of JP2008-069299, Mar. 27, 2008.*
International Search Report for International Application No. PCT/JP2011/068713, dated Sep. 13, 2011.

* cited by examiner

*Primary Examiner* — Hui Chin
(74) *Attorney, Agent, or Firm* — Birch, Stewart, Kolasch & Birch, LLP

(57) ABSTRACT

An impact resistance enhancing agent for a polylactic acid-based resin, containing a polyglycerol fatty acid ester made from a fatty acid containing at least one member selected from the group consisting of caprylic acid, capric acid, lauric acid, myristic acid, palmitic acid, stearic acid, and oleic acid, in an amount of 80% by mass or more of the constituting fatty acids, and a polyglycerol having an average degree of polymerization of from 2 to 40. The polylactic acid-based resin composition containing an impact resistance enhancing agent for a polylactic acid-based resin of the present invention has excellent impact resistance properties, so that the resin composition can be suitably used in, for example, agricultural materials, food wrapping materials, and other wrapping materials, and the like.

18 Claims, 3 Drawing Sheets

AGENT FOR IMPARTING IMPACT RESISTANCE TO POLYLACTIC ACID RESIN

TECHNICAL FIELD

The present invention relates to an impact resistance enhancing agent for a polylactic acid-based resin which enhances excellent impact resistance to a polylactic acid-based resin, and a polylactic acid-based resin composition containing the agent and a polylactic acid-based resin.

BACKGROUND ART

Material development using reproducible resources such as plant raw materials is a research theme of high social interests which should be started urgently from the viewpoint of recycling style social construction. If plastics made of petroleum as main raw materials can be replaced with bio-plastics produced from reproducible raw materials, carbon neutrality, i.e. an idea that an overall carbon dioxide content in the air does not increase even when materials incorporated with carbon dioxide are combusted in the environment during the process of photosynthesis, is realized, so that it can be contributed to the prevention of global warming.

Among the bioplastics, polylactic acids which can be produced from reproducible resources such as maize have been remarked with high interests, and the utilization of such polylactic acids has been already started in the medical fields. For the purpose of further application developments, in 2005 Aichi Expo, high potentials of the polylactic acids have been confirmed as practical materials by carrying out large-scaled verification tests and the like, and the polylactic acids have been expected to be utilized in agricultural materials (for example, sheets, films), food wrapping materials (for example, food wrapping films, sheets, bags), and other wrapping materials (for example, clothes, sundries wrapping sheets, films, bags), and the like.

Polylactic acids are crystalline thermoplastic polymers having tensile strength and transparency of the same level as PET (polyethylene terephthalate). The burned calories when combusted are as small as one-third that of PE (polyester), PP (polypropylene) or the like, so that little damage takes place in the combustion furnace or little harmful gases are generated. In addition, since the raw materials for the polylactic acid are plants as mentioned above, an increase in carbon dioxide when subjected to combustion treatment is less likely to cause a load to the environment, so that such materials are also eco-friendly. Because of the advantages mentioned above, research and development on production methods or applied uses have become more actively performed in the recent years, and diversified applications and increases in amounts produced will be expected in future.

However, polylactic acids are rigid and brittle, in other words have the properties with worsened impact properties, so that their industrial applications have been limited. Therefore, various studies have been made in order to improve the physical properties of the polylactic acids.

For example, Patent Publication 1 discloses a resin composition containing a polylactic acid and a flexible biodegradable aliphatic polyester such as polycaprolactone, polybutylene succinate or polyglycolide, wherein the polylactic acid is mixed with the flexible biodegradable aliphatic polyester.

Also, Patent Publication 2 discloses a polylactic acid-based resin composition added with a plasticizer such as di-i-butyl adipate or di-n-butyl sebacate, and Patent Publication 3 discloses an aliphatic polyester composition in which an aliphatic polyester, especially a polylactic acid, is blended with a polyglycerol acetic acid ester as a plasticizer.

Further, Patent Publications 4 and 5 disclose particular polymers comprising two polymers each satisfying particular relationships derived from dissolubility parameter values and density values as impact resistance enhancing agents for polylactic acids.

Furthermore, Patent Publication 6, an invention of a patent application previously filed by the inventors of the present application, reports that plasticity of a polylactic acid can be improved by adding to a polylactic acid a polyglycerol fatty acid ester having particular average degree of polymerization and fatty acid esterification ratio.

PRIOR ART PUBLICATIONS

Patent Publications

Patent Publication 1: Japanese Patent Laid-Open No. Hei-9-111107
Patent Publication 2: Japanese Patent Laid-Open No. Hei-4-335060
Patent Publication 3: Japanese Patent Laid-Open No. 2003-73532
Patent Publication 4: Japanese Patent Laid-Open No. 2003-268088
Patent Publication 5: Japanese Patent Gazette No. 3,972,615
Patent Publication 6: Japanese Patent Laid-Open No. 2008-69299

SUMMARY OF THE INVENTION

Problems to be Solved by the Invention

In accordance with the conventional techniques mentioned above, although polylactic acid-based resin compositions having improved plasticity can be provided, the properties thereof have not yet been found to be satisfactory. Specifically although impact properties of a polylactic acid are improved in the resin composition of Patent Publication 1, an overall composition still has a disadvantage in thermal properties because the amount of the aliphatic polyester is as relatively large as 10 parts by weight or more, and the glass transition temperature of this aliphatic polyester is lower than the glass transition temperature of the polylactic acid.

Although data are shown that the plasticizers described in Patent Publications 2 and 3 enhance flexibility of the polylactic acid, the patent publications are silent in impact properties and thermal properties so that these properties are still unclear. The impact resistance enhancing agents described in Patent Publications 4 and 5 are chemically synthesized products of petroleum raw materials such as succinic acid, propylene glycol, and hexamethylene diisocyanate, and the lowering of the glass transition temperature of the polylactic acid added with the impact resistance enhancing agent is controlled. However, the amount is as relatively large as 10% by weight or more based on the polylactic acid.

In the method described in Patent Publication 6, the lowering of the glass transition temperature is controlled, so that plasticity of the polylactic acid can be enhanced without impairing transparency, and the amount of the polyglycerol fatty acid ester is relatively small (about 10% by weight or so). However, the plasticized polylactic acid resin composition described in Patent Publication 6 is manufactured by a so-called solvent casting method. In other words, the production is not carried out with an ordinary molding processable machines for plastics, such as an extruder or an injection-molding machine, and the molding processability of this plasticized polylactic acid composition is unknown. Therefore, whether or not such a resin composition can be produced in an industrial scale is yet unknown.

An object of the present invention is to provide an impact resistance enhancing agent for a polylactic acid-based resin having improved impact properties and molding processability while maintaining thermal properties owned by the polylactic acid-based resin, and a polylactic acid-based resin composition containing the agent and a polylactic acid-based resin.

Means to Solve the Problems

As a result of intensive studies in order to solve the above problems, the present inventors have found that a polylactic acid-based resin composition having improved impact properties can be obtained while maintaining thermal properties and molding processability by adding a polyglycerol fatty acid ester made from a particular fatty acid and a polyglycerol as an impact resistance enhancing agent to a polylactic acid. Also, when the average degree of polymerization of the polyglycerol is within a particular range, they have found that preferred esterification ratios would differ depending upon the fatty acids used, and a polyglycerol fatty acid ester obtained by reacting a polyglycerol having a particular average degree of polymerization and a particular fatty acid at a particular esterification ratio gives even more improvement in the above properties. The present invention has been perfected thereby.

Specifically, the present invention relates to:

[1] an impact resistance enhancing agent for a polylactic acid-based resin, containing a polyglycerol fatty acid ester made from a fatty acid containing at least one member selected from the group consisting of caprylic acid, capric acid, lauric acid, myristic acid, palmitic acid, stearic acid, and oleic acid, in an amount of 80% by mass or more of the constituting fatty acids, and a polyglycerol having an average degree of polymerization of from 2 to 40; and

[2] a polylactic acid-based resin composition containing a polylactic acid-based resin and the impact resistance enhancing agent as defined in the above [1].

Effects of the Invention

The impact resistance enhancing agent for a polylactic acid-based resin of the present invention exhibits excellent effects of enhancing impact properties, while maintaining thermal properties and molding processability owned by the polylactic acid-based resin.

MODES FOR CARRYING OUT THE INVENTION

Figure 1:
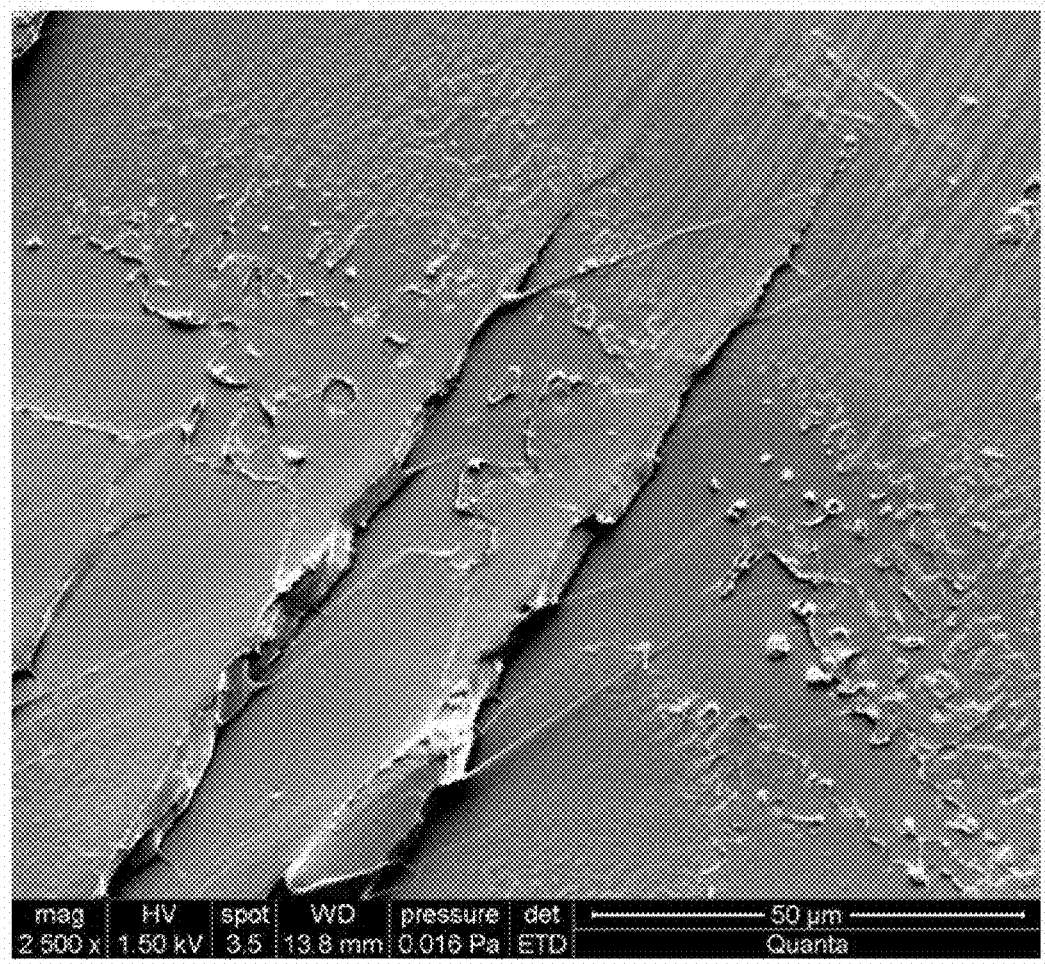
FIG. 1 An SEM photograph of Comparative Example 1 (polylactic acid) at a magnification of 2,500.

The impact resistance enhancing agent for a polylactic acid-based resin of the present invention contains a polyglycerol fatty acid ester, and the polyglycerol fatty acid ester features in having a specified structure. A polylactic acid-based resin is rigid in its molecular structure, so that the resin is hard so that a molded article is likely to be cracked. In view of the above, as a result of studies made by the present inventors, it is deduced that a polyglycerol fatty acid ester having a particular structure is added to a polylactic acid-based resin while mixing, and thereby the polyglycerol fatty acid ester is dispersed in the order of microns to form a sea-island structure where the polylactic acid-based resin constitutes the matrix, and the polyglycerol fatty acid ester constitutes fine islands; therefore, this sea-island structure absorbs impact energy from its external, whereby impact properties can be enhanced. In addition, the polyglycerol fatty acid esters having particular structures also show slightly differences in structures depending upon their compositions; therefore, as a result of further studies, some preferred embodiments are found to exist in the constituting fatty acids thereof and the esterification ratio thereof depending upon the average degree of polymerization of the constituting polyglycerol. In a case of a polyglycerol fatty acid ester having particular components, in other words, in a case where a polyglycerol having a particular average degree of polymerization and particular fatty acids are subject to ester bonding at a particular esterification ratio, it is deduced that a sea-island structure is more likely to absorb impact energy. The sea-island structure can be observed with an SEM photograph.

The polyglycerol fatty acid ester contained in the impact resistance enhancing agent for a polylactic acid-based resin of the present invention (also simply referred to as the impact resistance enhancing agent of the present invention) contains as constituents a polyglycerol, a polymer of glycerol, and fatty acids, and these components are subject to ester bonding via hydroxyl groups of the polyglycerol and carboxyl acid moieties of the fatty acids. In other words, the polyglycerol fatty acid ester contains a fatty acid containing at least one member selected from the group consisting of caprylic acid, capric acid, lauric acid, myristic acid, palmitic acid, stearic acid, and oleic acid in an amount of 80% by mass or more, preferably 85% by mass or more, and more preferably 90% by mass or more, of the constituting fatty acids, and a polyglycerol. The content of the fatty acids as used herein when two or more kinds of the above fatty acid are used means a total content thereof, and the constituting fatty acids as used herein mean a combined mixture of all the fatty acid components constituting the polyglycerol fatty acid ester.

Here, in the present specification, caprylic acid is a saturated linear fatty acid having 8 carbon atoms, capric acid is one that having 10 carbon atoms, lauric acid is one that having 12 carbon atoms, myristic acid is one that having 14 carbon atoms, palmitic acid is one that having 16 carbon atoms, and stearic acid is one that having 18 carbon atoms, and oleic acid is an unsaturated fatty acid having 18 carbon atoms. Also, as the raw material fatty acids used in the production of the polyglycerol fatty acid ester, the term "caprylic acid" means the raw material fatty acids containing caprylic acid in an amount of preferably 85% by mass or more, more preferably 90% by mass or more, and even more preferably 95% by mass or more;

the term "capric acid" means the fatty acids containing capric acid in an amount of preferably 85% by mass or more, more preferably 90% by mass or more, and even more preferably 95% by mass or more;

the term "lauric acid" means the fatty acids containing lauric acid in an amount of preferably 85% by mass or more, more preferably 90% by mass or more, and even more preferably 95% by mass or more;

the term "myristic acid" means the fatty acids containing myristic acid in an amount of preferably 85% by mass or more, more preferably 90% by mass or more, and even more preferably 95% by mass or more;

the term "palmitic acid" means the fatty acids containing palmitic acid in an amount of preferably 85% by mass or more, more preferably 90% by mass or more, and even more preferably 95% by mass or more;

the term "stearic acid" means the fatty acids containing stearic acid in an amount of preferably 85% by mass or more, more preferably 90% by mass or more, and even more preferably 95% by mass or more; and the term "oleic acid" means the fatty acids containing oleic acid in an amount of preferably 80% by mass or more, more preferably 85% by mass or more, and even more preferably 90% by mass or more.

The raw material fatty acids components of the constituting fatty acids of the polyglycerol fatty acid ester are exemplified by, for example, the following groups (a) to (v). Here, the proportion in the raw material fatty acid components of the constituting fatty acids means a proportion of the number of moles calculated with molecular weights described in each of the raw materials, % by mol.

(a) only caprylic acid;
(b) only capric acid;
(c) only lauric acid;
(d) caprylic acid and capric acid;
(e) caprylic acid and lauric acid;
(f) capric acid and lauric acid;
(g) lauric acid and palmitic acid;
(h) only myristic acid;
(i) myristic acid and palmitic acid;
(j) myristic acid and stearic acid;
(k) myristic acid, palmitic acid, and stearic acid;
(l) myristic acid and oleic acid;
(m) only palmitic acid;
(n) palmitic acid and stearic acid;
(o) palmitic acid and oleic acid;
(p) only stearic acid;
(q) lauric acid and stearic acid;
(r) stearic acid and oleic acid;
(s) stearic acid, palmitic acid, and oleic acid;
(t) stearic acid, palmitic acid, and lauric acid;
(u) stearic acid, oleic acid, myristic acid, palmitic acid, and lauric acid; and
(v) only oleic acid.

(d) Caprylic Acid and Capric Acid

This embodiment is a combination of two kinds, caprylic acid and capric acid. The constitutional proportions thereof are, but not particularly limited to, as follows: It is preferable that caprylic acid is from 90 to 10% by mol, and that capric acid is from 10 to 90% by mol. It is more preferable that caprylic acid is from 70 to 30% by mol, and that capric acid is from 30 to 70% by mol.

(e) Caprylic Acid and Lauric Acid

This embodiment is a combination of two kinds, caprylic acid and lauric acid. The constitutional proportions thereof are, but not particularly limited to, as follows: It is preferable that caprylic acid is from 90 to 10% by mol, and that lauric acid is from 10 to 90% by mol. It is more preferable that caprylic acid is from 70 to 30% by mol, and that lauric acid is from 30 to 70% by mol.

(f) Capric Acid and Lauric Acid

This embodiment is a combination of two kinds, capric acid and lauric acid. The constitutional proportions thereof are, but not particularly limited to, as follows: It is preferable that capric acid is from 90 to 10% by mol, and that lauric acid is from 10 to 90% by mol. It is more preferable that capric acid is from 70 to 30% by mol, and that lauric acid is from 30 to 70% by mol.

(g) Lauric Acid and Palmitic Acid

This embodiment is a combination of two kinds, lauric acid and palmitic acid. The constitutional proportions thereof are, but not particularly limited to, as follows: It is preferable that lauric acid is from 90 to 10% by mol, and that palmitic acid is from 10 to 90% by mol. It is more preferable that lauric acid is from 70 to 30% by mol, and that palmitic acid is from 30 to 70% by mol.

(i) Myristic Acid and Palmitic Acid

This embodiment is a combination of two kinds, myristic acid and palmitic acid. The constitutional proportions thereof are, but not particularly limited to, as follows: It is preferable that myristic acid is from 90 to 10% by mol, and that palmitic acid is from 10 to 90% by mol. It is more preferable that myristic acid is from 70 to 30% by mol, and that palmitic acid is from 30 to 70% by mol.

(j) Myristic Acid and Stearic Acid

This embodiment is a combination of two kinds, myristic acid and stearic acid. The constitutional proportions thereof are, but not particularly limited to, as follows: It is preferable that myristic acid is from 90 to 10% by mol, and that stearic acid is from 10 to 90% by mol. It is more preferable that myristic acid is from 70 to 30% by mol, and that stearic acid is from 30 to 70% by mol.

(k) Myristic Acid, Palmitic Acid, and Stearic Acid

This embodiment is a combination of three kinds, myristic acid, palmitic acid, and stearic acid. The constitutional proportions thereof are, but not particularly limited to, as follows: It is preferable that myristic acid is from 40 to 90% by mol, that palmitic acid is from 30 to 5% by mol, and that stearic acid is from 30 to 5% by mol. It is more preferable that myristic acid is from 40 to 60% by mol, that palmitic acid is from 30 to 20% by mol, and that stearic acid is from 30 to 20% by mol.

(l) Myristic Acid and Oleic Acid

This embodiment is a combination of two kinds, myristic acid and oleic acid. The constitutional proportions thereof are, but not particularly limited to, as follows: It is preferable that myristic acid is from 90 to 10% by mol, and that oleic acid is from 10 to 90% by mol. It is more preferable that myristic acid is from 70 to 30% by mol, and that oleic acid is from 30 to 70% by mol.

(n) Palmitic Acid and Stearic Acid

This embodiment is a combination of two kinds, palmitic acid and stearic acid. The constitutional proportions thereof are, but not particularly limited to, as follows: It is preferable that palmitic acid is from 90 to 10% by mol, and that stearic acid is from 10 to 90% by mol. It is more preferable that palmitic acid is from 70 to 30% by mol, and that stearic acid is from 30 to 70% by mol (o) Palmitic Acid and Oleic Acid This embodiment is a combination of two kinds, palmitic acid and oleic acid. The constitutional proportions thereof are, but not particularly limited to, as follows: It is preferable that palmitic acid is from 90 to 10% by mol, and that oleic acid is from 10 to 90% by mol. It is more preferable that palmitic acid is from 70 to 30% by mol, and that oleic acid is from 30 to 70% by mol.

(q) Lauric Acid and Stearic Acid

This embodiment is a combination of two kinds, lauric acid and stearic acid. The constitutional proportions thereof are, but not particularly limited to, as follows: It is preferable that lauric acid is from 90 to 10% by mol, and that stearic acid is from 10 to 90% by mol. It is more preferable that lauric acid is from 70 to 30% by mol, and that stearic acid is from 30 to 70% by mol.

(r) Stearic Acid and Oleic Acid

This embodiment is a combination of two kinds, stearic acid and oleic acid. The constitutional proportions thereof are, but not particularly limited to, as follows: It is preferable that stearic acid is from 90 to 10% by mol, and that oleic acid is from 10 to 90% by mol. It is more preferable that stearic acid is from 70 to 30% by mol, and that oleic acid is from 30 to 70% by mol.

(s) Stearic Acid, Palmitic Acid, and Oleic Acid

This embodiment is a combination of three kinds, stearic acid, palmitic acid, and oleic acid. The constitutional proportions thereof are, but not particularly limited to, as follows: It is preferable that stearic acid is from 30 to 5% by mol, that palmitic acid is from 30 to 5% by mol, and that oleic acid is from 40 to 90% by mol. It is more preferable that stearic acid is from 30 to 20% by mol, that palmitic acid is from 30 to 20% by mol, and that oleic acid is from 40 to 60% by mol.

(t) Stearic Acid, Palmitic Acid, and Lauric Acid

This embodiment is a combination of three kinds, stearic acid, palmitic acid, and lauric acid. The constitutional proportions thereof are, but not particularly limited to, as follows: It is preferable that stearic acid is from 5 to 30% by mol, that palmitic acid is from 5 to 30% by mol, and that lauric acid is from 90 to 40% by mol. It is more preferable that stearic acid is from 20 to 30% by mol, that palmitic acid is from 20 to 30% by mol, and that lauric acid is from 60 to 40% by mol.

(u) Stearic Acid, Oleic Acid, Myristic Acid, Palmitic Acid, and Lauric Acid

This embodiment is a combination of five kinds, stearic acid, oleic acid, myristic acid, palmitic acid, and lauric acid. The constitutional proportions thereof are, but not particularly limited to, as follows: It is preferable that stearic acid is from 10 to 60% by mol, that oleic acid is from 10 to 40% by mol, that myristic acid is from 1 to 15% by mol, that palmitic acid is from 10 to 70% by mol, and that lauric acid is from 5 to 30% by mol. It is more preferable that stearic acid is from 15 to 35% by mol, that oleic acid is from 10 to 30% by mol, that myristic acid is from 1 to 10% by mol, that palmitic acid is from 25 to 45% by mol, and that lauric acid is from 5 to 25% by mol. One preferred embodiment is exemplified by stearic acid in an amount of 25% by mol, oleic acid in an amount of 20% by mol, myristic acid in an amount of 5% by mol, palmitic acid in an amount of 35% by mol, and lauric acid in an amount of 15% by mol.

In addition, the polyglycerol which is another constituent of the polyglycerol fatty acid ester is not particularly limited, and the polyglycerol having an average degree of polymerization of from 2 to 40 is used, from the viewpoint of molding processability in the polylactic acid-based resin composition. Here, in the present specification, the average degree of polymerization of the polyglycerol (simply referred to as a degree of polymerization in some cases) is calculated according to the formula for the hydroxyl value of the polyglycerol given hereinbelow.

<Formula for Hydroxyl Value of Polyglycerol>

$$OHV = \frac{56110(n+2)}{(74n+18)}$$

wherein OHV: a hydroxyl value of the polyglycerol, and n: an average degree of polymerization of the polyglycerol.

The esterification ratio of the polyglycerol fatty acid ester in the present invention can be adjusted by changing the initially charging ratios of the polyglycerol and the fatty acids, so that the esterification ratio can be properly adjusted so long as the above fatty acids and the polyglycerol are used, without being particularly limited thereto. Here, in the present invention, the esterification ratio is calculated in accordance with the following formula given below.

<Esterification Ratio of Polyglycerol Fatty Acid Ester>

$$\text{Esterification Ratio}(\%) = \frac{\text{Number of mol of Constituting Fatty Acids}}{\text{Number of mol of Total Hydroxyl Groups of the Constituting Polyglycerol}} \times 100(\%)$$

In addition, the polyglycerol fatty acid ester in the present invention includes the following three embodiments depending upon an average degree of polymerization of the polyglycerol.

(1) Embodiment containing a polyglycerol having an average degree of polymerization of from 2 to 4 (Embodiment 1)
(2) Embodiment containing a polyglycerol having an average degree of polymerization of from 5 to 10 (Embodiment 2)
(3) Embodiment containing a polyglycerol having an average degree of polymerization of from 11 to 40 (Embodiment 3)

(1) Polyglycerol Fatty Acid Ester of Embodiment 1

The polyglycerol fatty acid ester of Embodiment 1 contains a polyglycerol having an average degree of polymerization of from 2 to 4, so that the polyglycerol fatty acid ester features in that the molecular weight thereof is relatively small. The polyglycerol having an average degree of polymerization of from 2 to 4 is relatively inexpensive, thereby making it possible to prepare a polyglycerol fatty acid ester itself relatively inexpensively.

The fatty acids in the polyglycerol fatty acid ester of Embodiment 1 contains at least one member selected from the group consisting of caprylic acid, capric acid, lauric acid, myristic acid, palmitic acid, stearic acid, and oleic acid in an amount of preferably 80% by mass or more, more preferably 85% by mass or more, and even more preferably 90% by mass or more, of the constituting fatty acids. The above fatty acids bind to a polyglycerol having a low degree of polymerization, and in order to enhance impact properties of the polylactic acid-based resin, the esterification ratio is preferably from 30 to 100%, and more preferably from 30 to 90%, from the viewpoint that the resulting polyglycerol fatty acid ester forms islands of appropriate sizes of a sea-island structure in the polylactic acid-based resin. Also, in the present invention, the fatty acids are more preferably selected from the following groups (1-a) to (1-d):

(1-a) at least three members selected from the group consisting of caprylic acid, capric acid, lauric acid, myristic acid, palmitic acid, stearic acid, and oleic acid;
(1-b) only lauric acid;
(1-c) palmitic acid and/or stearic acid; and
(1-d) only oleic acid, from the viewpoint of even more enhancing impact properties of the polylactic acid-based resin.

(1-a)

The fatty acids of (1-a) include fatty acids containing at least three members selected from the group consisting of caprylic acid, capric acid, lauric acid, myristic acid, palmitic acid, stearic acid, and oleic acid in an amount of preferably 80% by mass or more, more preferably 85% by mass or more, and even more preferably 90% by mass or more, of the constituting fatty acids. In particular, in order to enhance impact properties of the polylactic acid-based resin, it is preferable that the fatty acids contain at least two groups out of (i) at least one member selected from caprylic acid, capric acid, and lauric acid; (ii) at least one member selected from myristic acid, palmitic acid, and stearic acid; and (iii) oleic acid, the fatty acids containing three or more kinds of acids, from the viewpoint that the resulting polyglycerol fatty acid ester forms islands of appropriate sizes of a sea-island structure in the polylactic acid-based resin. The constitutional proportions of the raw material fatty acids are, but not particularly limited to, as follows: In one example, it is preferable that stearic acid is from 10 to 60% by mol, that oleic acid is from 10 to 40% by mol, that myristic acid is from 1 to 15% by mol, that palmitic acid is from 10 to 70% by mol, and that lauric acid is from 5 to 30% by mol. It is more preferable that stearic acid is from 15 to 35% by mol, that oleic acid is from 10 to 30% by mol, that myristic acid is from 1 to 10% by mol, that palmitic acid is from 25 to 45% by mol, and that lauric acid is from 5 to 25% by mol. When the fatty acids of the above combinations are used, the esterification ratio is preferably from 30 to 90%, more preferably from 40 to 80%, and even more preferably from 45 to 80%, from the same viewpoint as above.

(1-b)

The fatty acids of (1-b) include fatty acids containing lauric acid in an amount of preferably 85% by mass or more, more preferably 90% by mass or more, and even more preferably 95% by mass or more, of the constituting fatty acids. In order to enhance impact properties of the polylactic acid-based resin, the esterification ratio is preferably from 40 to 100%, and more preferably from 50 to 90%, from the viewpoint that the resulting polyglycerol fatty acid ester forms islands of appropriate sizes in a so-called sea-island structure in the polylactic acid-based resin.

(1-c)

The fatty acids of (1-c) include fatty acids containing palmitic acid and/or stearic acid in an amount of preferably 85% by mass or more, more preferably 90% by mass or more, and even more preferably 95% by mass or more, of the constituting fatty acids. In particular, in order to enhance impact properties of the polylactic acid-based resin, it is preferable that palmitic acid and stearic acid are both contained, from the viewpoint that the resulting polyglycerol fatty acid ester forms islands of appropriate sizes in a so-called sea-island structure in the polylactic acid-based resin. The constitutional proportions of the raw material fatty acids are, but not particularly limited to, as follows: It is preferable that palmitic acid is from 90 to 10% by mol, and that stearic acid is from 10 to 90% by mol. It is more preferable that palmitic acid is from 70 to 30% by mol, and that stearic acid is from 30 to 70% by mol. When the above fatty acids are used, the esterification ratio is preferably from 30 to 70%, more preferably from 35 to 65%, and even more preferably from 35 to 60%, from the same viewpoint as above.

(1-d)

The fatty acids of (1-d) include fatty acids containing oleic acid in an amount of preferably 80% by mass or more, preferably 85% by mass or more, and even more preferably 90% by mass or more, of the constituting fatty acids. In order to enhance impact properties of the polylactic acid-based resin, the esterification ratio is preferably from 30 to 70%, more preferably from 35 to 65%, and even more preferably from 35 to 60%, from the viewpoint that the resulting polyglycerol fatty acid ester forms islands of appropriate sizes in a so-called sea-island structure in the polylactic acid-based resin.

(2) Polyglycerol Fatty Acid Ester of Embodiment 2

The polyglycerol fatty acid ester of Embodiment 2 contains a polyglycerol having an average degree of polymerization of preferably from 5 to 10, having a higher average degree of polymerization as compared to that of Embodiment 1, whereby the polyglycerol fatty acid ester features in having a large molecular weight, so that the impact properties of the polylactic acid-based resin can be enhanced in a broad range of esterification ratios.

The fatty acid in the polyglycerol fatty acid ester of Embodiment 2 contains at least one member selected from the group consisting of caprylic acid, capric acid, lauric acid, myristic acid, palmitic acid, stearic acid, and oleic acid in an amount of preferably 80% by mass or more, more preferably 85% by mass or more, and even more preferably 90% by mass or more, of the constituting fatty acids. Since the above fatty acid binds to a polyglycerol having a relatively low degree of polymerization, in order to enhance impact properties of the polylactic acid-based resin, the esterification ratio is preferably from 5 to 90%, more preferably from 7 to 90%, and even more preferably from 20 to 90%, from the viewpoint that the resulting polyglycerol fatty acid ester forms islands of appropriate sizes in a so-called sea-island structure in the polylactic acid-based resin. Also, in the present invention, fatty acids selected from the following groups (2-a) to (2-f) are more preferred:

(2-a)
   (i) lauric acid and palmitic acid,
   (ii) lauric acid and stearic acid, or
   (iii) lauric acid, palmitic acid, and stearic acid;
(2-b) only oleic acid;
(2-c) palmitic acid and/or stearic acid;
(2-d)
   (i) palmitic acid and oleic acid,
   (ii) stearic acid and oleic acid, or
   (iii) palmitic acid, stearic acid, and oleic acid;
(2-e) only capric acid; and
(2-f) only lauric acid,
from the viewpoint of even more enhancing the impact properties of the polylactic acid-based resin.

(2-a)

The fatty acids of (2-a) include fatty acids containing:
(i) lauric acid and palmitic acid,
(ii) lauric acid and stearic acid, or
(iii) lauric acid, palmitic acid, and stearic acid
in an amount of preferably 85% by mass or more, more preferably 90% by mass or more, and even more preferably 95% by mass or more, of the constituting fatty acids. In particular, in order to enhance impact properties of the polylactic acid-based resin, from the viewpoint that the resulting polyglycerol fatty acid ester forms islands of appropriate sizes in a so-called sea-island structure in the polylactic acid resin, in the case of (i), the constitutional proportions of the raw material fatty acids are, but not particularly limited to, as follows. It is preferable that lauric acid is from 90 to 10% by mol, and that palmitic acid is from 10 to 90% by mol. It is more preferable that lauric acid is from 70 to 30% by mol, and that palmitic acid is from 30 to 70% by mol. In the case of (ii), the constitutional proportions of the raw material fatty acids are, but not particularly limited to, as follows. It is preferable that lauric acid is from 90 to 10% by mol, and that stearic acid is from 10 to 90% by mol. It is more preferable that lauric acid is from 70 to 30% by mol, and that stearic acid is from 30 to 70% by mol. In the case of (iii), the constitutional proportions of the raw material fatty acids are, but not particularly limited to, as follows. It is preferable that stearic acid is from 30 to 5% by mol, that palmitic acid is from 30 to 5% by mol, and that lauric acid is from 40 to 90% by mol. It is more preferable that stearic acid is from 30 to 20% by mol, that palmitic acid is from 30 to 20% by mol, and that lauric acid is from 40 to 60% by mol. When the above fatty acids are used, the esterification ratio is preferably from 5 to 70%, more preferably from 10 to 65%, even more preferably from 40 to 65%, and even more preferably from 40 to 60%, from the same viewpoint as above.

(2-b)

The fatty acids of (2-b) include fatty acids containing oleic acid in an amount of preferably 80% by mass or more, more preferably 85% by mass or more, and even more preferably 90% by mass or more, of the constituting fatty acids. In order to enhance impact properties of the polylactic acid-based resin, the esterification ratio is preferably from 5 to 70%, more preferably from 10 to 65%, even more preferably from 30 to 65%, and even more preferably from 30 to 60%, from the viewpoint that the resulting polyglycerol fatty acid ester forms islands of appropriate sizes in a so-called sea-island structure in the polylactic acid-based resin.

(2-c)

The fatty acids of (2-c) include fatty acids containing palmitic acid and/or stearic acid in an amount of preferably 85% by mass or more, more preferably 90% by mass or more, and even more preferably 95% by mass or more, of the constituting fatty acids. In particular, in order to enhance impact properties of the polylactic acid-based resin, those containing both palmitic acid and stearic acid are preferred, from the viewpoint that the resulting polyglycerol fatty acid ester forms islands of appropriate sizes in a so-called sea-island structure in the polylactic acid-based resin. The constitutional proportions of the raw material fatty acids are, but not particularly limited to, as follows. It is preferable that palmitic acid is from 90 to 10% by mol, and that stearic acid is from 10 to 90% by mol. It is more preferable that palmitic acid is from 70 to 30% by mol, and that stearic acid is from 30 to 70% by mol. When the above fatty acids are used, the esterification ratio is preferably from 5 to 60%, more preferably from 10 to 50%, even more preferably from 30 to 50%, and even more preferably from 30 to 45%, from the same viewpoint as above.

(2-d)

The fatty acids of (2-d) include fatty acids containing:
(i) palmitic acid and oleic acid,
(ii) stearic acid and oleic acid, or
(iii) palmitic acid, stearic acid, and oleic acid
in an amount of preferably 80% by mass or more, more preferably 85% by mass or more, and even more preferably 90% by mass or more, of the constituting fatty acids. In particular, in order to enhance impact properties of the polylactic acid-based resin, from the viewpoint that the resulting polyglycerol fatty acid ester forms islands of appropriate sizes ion a so-called sea-island structure in the polylactic acid-based resin, in the case of (i), the constitutional proportions of the raw material fatty acids are, but not particularly limited to, as follows. It is preferable that palmitic acid is from 90 to 10% by mol, and that oleic acid is from 10 to 90% by mol. It is more preferable that palmitic acid is from 70 to 30% by mol, and that oleic acid is from 30 to 70% by mol. In the case of (ii), the constitutional proportions of the raw material fatty acids are, but not particularly limited to, as follows. It is preferable that stearic acid is from 90 to 10% by mol, and that oleic acid is from 10 to 90% by mol. It is more preferable that stearic acid is from 70 to 30% by mol, and that oleic acid is from 30 to 70% by mol. In the case of (iii), the constitutional proportions of the raw material fatty acids are, but not particularly limited to, as follows. It is preferable that stearic acid is from 30 to 5% by mol, that palmitic acid is from 30 to 5% by mol, and that oleic acid is from 40 to 90% by mol. It is more preferable that stearic acid is from 30 to 20% by mol, that palmitic acid is from 30 to 20% by mol, and that oleic acid is from 40 to 60% by mol. When the above fatty acids are used, the esterification ratio is preferably from 5 to 80%, more preferably from 20 to 70%, even more preferably from 30 to 70%, and even more preferably from 30 to 65%, from the same viewpoint as above.

(2-e)

The fatty acids of (2-e) include fatty acids containing capric acid in an amount of preferably 85% by mass or more, more preferably 90% by mass or more, and even more preferably from 95% by mass or more, of the constituting fatty acids. In order to enhance impact properties of the polylactic acid-based resin, the esterification ratio is preferably from 50 to 100%, and more preferably from 50 to 90%, from the viewpoint that the resulting polyglycerol fatty acid ester forms islands of appropriate sizes in a so-called sea-island structure in the polylactic acid resin.

(2-f)

The fatty acids of (2-f) include fatty acids containing lauric acid in an amount of preferably 85% by mass or more, more preferably 90% by mass or more, and even more preferably 95% by mass or more, of the constituting fatty acids. In order to enhance impact properties of the polylactic acid-based resin, the esterification ratio is preferably from 7 to 70%, and more preferably from 7 to 60%, from the viewpoint that the resulting polyglycerol fatty acid ester forms islands of appropriate sizes in a so-called sea-island structure in the polylactic acid-based resin.

(3) Polyglycerol Fatty Acid Ester of Embodiment 3

The polyglycerol fatty acid ester of Embodiment 3 contains a polyglycerol having an average degree of polymerization of preferably from 11 to 40, having a higher average degree of polymerization, the polyglycerol fatty acid ester features in having a large molecular weight, so that bleeding properties are improved, and that impact properties of the polylactic acid-based resin can be enhanced.

The polyglycerol fatty acid ester of Embodiment 3 contains at least one member selected from the group consisting of caprylic acid, capric acid, lauric acid, myristic acid, palmitic acid, stearic acid, and oleic acid in an amount of preferably 80% by mass or more, more preferably 85% by mass or more, and even more preferably 90% by mass or more, of the constituting fatty acids. Since the above fatty acid is bound to a polyglycerol having a high degree of polymerization, in order to enhance impact properties of the polylactic acid-based resin, the esterification ratio is preferably from 5 to 80%, more preferably from 30 to 75%, and even more preferably from 30 to 70%, from the viewpoint that the resulting polyglycerol fatty acid ester forms islands of appropriate sizes in a so-called sea-island structure in the polylactic acid-based resin. Also, in the present invention, the fatty acids selected from the following groups (3-a) to (3-c):
(3-a) at least one member selected from the group consisting of caprylic acid, capric acid, and lauric acid;
(3-b) at least one member selected from the group consisting of myristic acid, palmitic acid, stearic acid, and oleic acid; or
(3-c) lauric acid, palmitic acid, and stearic acid
are more preferred, from the viewpoint of even more enhancing impact properties of the polylactic acid-based resin.

(3-a)

The fatty acids of (3-a) include fatty acids containing at least one member selected from the group consisting of caprylic acid, capric acid, and lauric acid in an amount of preferably 85% by mass or more, more preferably 90% by mass or more, and even more preferably 95% by mass or more, of the constituting fatty acids. In order to enhance impact properties of the polylactic acid-based resin, the esterification ratio is preferably from 30 to 80%, more preferably from 30 to 75%, even more preferably from 50 to 75%, and even more preferably from 50 to 70%, from the viewpoint that the resulting polyglycerol fatty acid ester forms islands of appropriate sizes in a so-called sea-island structure in the polylactic acid-based resin.

(3-b)

The fatty acids of (3-b) include fatty acids containing at least one member selected from the group consisting of myristic acid, palmitic acid, stearic acid, and oleic acid in an amount of preferably 80% by mass or more, more preferably 85% by mass or more, and even more preferably 90% by mass or more, of the constituting fatty acids. In order to enhance impact properties of the polylactic acid-based resin, the esterification ratio is preferably from 5 to 60%, more preferably from 30 to 50%, and even more preferably from 30 to 45%, from the viewpoint that the resulting polyglycerol fatty acid ester forms islands of appropriate sizes in a so-called sea-island structure in the polylactic acid-based resin.

(3-c)

The fatty acids of (3-c) include fatty acids containing lauric acid, palmitic acid, and stearic acid in an amount of preferably 85% by mass or more, more preferably 90% by mass or more, and even more preferably 95% by mass or more, of the constituting fatty acids. In order to enhance impact properties of the polylactic acid-based resin, the esterification ratio is preferably from 20 to 60%, and more preferably from 20 to 50%, from the viewpoint that the resulting polyglycerol fatty acid ester forms islands of appropriate sizes in a so-called sea-island structure in the polylactic acid-based resin.

Here, in the present invention, in addition to the above fatty acids, other fatty acids can be contained within the range that would not impair the effects of the present invention. Other fatty acids include saturated or unsaturated, linear or branched fatty acids having from 6 to 22 carbon atoms. Specifically, the other fatty acids include saturated fatty acids such as caproic acid, nonadecanoic acid, arachidic acid, behenic acid, lignoceric acid; and unsaturated fatty acids such as palmitoleic acid, elaidic acid, gadoleic acid, erucic acid, nervonic acid, linoleic acid, eicosadienoic acid, docosadienoic acid, linolenic acid, stearidonic acid, arachidonic acid, and eicosapentanoic acid, and docosahexanoic acid. Furthermore, other fatty acids include isostearic acid, ricinoleic acid, 12-hydroxstearic acid, 9-hydroxystearic acid, 10-hydroxystearic acid, hydrogenated castor oil fatty acids (fatty acids containing, in addition to 12-hydroxystearic acid, stearic acid and palmitic acid in small amounts), and the like.

The esterification reaction between the polyglycerol and the fatty acids is not particularly limited as long as it is a general synthesis method, and the esterification reaction can be carried out, for example, by heating a polyglycerol and fatty acids in the range of preferably from 100° to 300° C., and more preferably from 120° to 260° C., in the presence of an acid catalyst such as phosphoric acid or p-toluenesulfonic acid, or an alkali catalyst such as sodium hydroxide, or without a catalyst, while removing water. In addition, the reaction may be carried out in the presence of an inert gas. The ester thus obtained may be purified according to its purpose. In the purification, in addition to a distillation technique such as distillation under a reduced pressure, molecular distillation, or steam distillation, extraction with an organic solvent, fractionation, or chromatography separation using a column packed with a synthetic adsorbent or a gel filtration agent can be also utilized.

Thus, the polyglycerol fatty acid ester in the present invention is obtained. The content of the polyglycerol fatty acid ester as defined in the present invention in the impact resistance enhancing agent is, but not particularly limited to, preferably 80% by mass or more, more preferably 85% by mass or more, even more preferably 90% by mass or more, even more preferably 95% by mass or more, even more preferably 99% by mass or more, and even more preferably substantially 100% by mass.

The present invention also provides a polylactic acid-based resin composition containing the above impact resistance enhancing agent of the present invention and a polylactic acid-based resin.

The polylactic acid-based resin in the present invention is an aliphatic polyester resin containing a lactic acid unit [$CH_3CH(OH)COOH$] in the molecule, and the polylactic acid-based resin is an aliphatic polyester resin that contains the lactic acid unit in an amount of at least 50% by mol, preferably 60% by mol or more, and more preferably 70% by mol or more in the molecule.

Specific examples include:
(1) a polylactic acid;
(2) a lactic acid-other aliphatic hydroxycarboxylic acid copolymer,
(3) a polylactic acid-based resin containing a polyfunctional polysaccharide and a lactic acid unit,
(4) a polylactic acid-based resin containing an aliphatic polycarboxylic acid unit, aliphatic polyhydric alcohol unit, and a lactic acid unit, and
(5) a mixture of (1) to (4).

(1) Polylactic Acid

The polylactic acid refers to a polymer in which L-lactic acid and/or D-lactic acid is substantially polymerized with an ester bond. Here, the word "substantially" means that monomer units other than L-lactic acid or D-lactic acid may be contained within the range that would not impair the effects of the present invention. The polylactic acid used in the present invention includes a poly(L-lactic acid) of which constituting units are only composed of L-lactic acid, a poly(D-lactic acid) of which constituting units are only composed of D-lactic acid, and a poly(DL-lactic acid) of which constituting units are L-lactic acid units and D-lactic acid units that are present in various proportions, and the like. Here, in the present specification, when simply referred to as lactic acid, it means both L-form and D-form unless specified otherwise.

The method for synthesizing a polylactic acid includes a method of direct dehydration polycondensation of L-lactic acid, D-lactic acid, or DL-lactic acid, a method of ring-opening polymerization of an annular dimer lactide of each of these lactic acids, and the like. In addition, in any of the polymerization methods, a chain extender may be added at a stage in the course of polymerization in order to increase its molecular weight. Also, the ring opening polymerization may be carried out in the presence of a compound having a hydroxyl group, such as a higher alcohol or a hydroxycarboxylic acid, which can be produced by any of the methods.

As the polylactic acid, those synthesized in accordance with the above method may be used, or a commercially available product may be used from the viewpoint of its availability. Specific examples include Ingeo (registered trademark) manufactured by Nature Works, U'z (registered trademark) manufactured by TOYOTA MOTOR CORPORATION, TONE (registered trademark) manufactured by UCC, Lacty (registered trademark) manufactured by Shimadzu Corporation, Teramac (registered trademark) manufactured by UNITIKA LTD., LACEA manufactured by Mitsui Chemicals, Inc., LACTRON (registered trademark) manufactured by Kanebo Gosen, Ecoloju (registered trademark) manufactured by Mitsubishi Plastics, Inc., PLASTARCH (registered trademark) manufactured by Kuraray Co., Ltd., Palgreen (registered trademark) manufactured by TOHCELLO, and the like.

(2) Lactic Acid-Other Aliphatic Hydroxycarboxylic Acid Copolymer

The lactic acid-other aliphatic hydroxycarboxylic acid copolymer refers to a copolymer formed between lactic acid and other aliphatic hydroxycarboxylic acid. Lactic acid is as mentioned above. On the other hand, the aliphatic hydroxycarboxylic acid includes glycolic acid, 3-hydroxybutyric acid, 4-hydroxybutyric acid, 4-hydroxyvaleric acid, 5-hydroxyvaleric acid, 6-hydroxycaproic acid, and the like.

A method for producing a lactic acid-other aliphatic hydroxycarboxylic acid copolymer includes a method of dehydration polycondensation of each of the above lactic acids and the above aliphatic hydroxycarboxylic acid, a method of a ring-opening copolymerization of a lactide, a dimer of an annular form of each of the above lactic acids, and an annular form of the above aliphatic hydroxycarboxylic acid, and the like. The copolymer may be produced by any of the methods. It is preferable that the amount of the lactic acid monomers contained in the lactic acid-other aliphatic hydroxycarboxylic acid copolymer is at least 50% by mol.

(3) Polylactic Acid-based Resin Containing Polyfunctional Polysaccharides and Lactic Acid Units The polyfunctional polysaccharides in the polylactic acid-based resin containing polyfunctional polysaccharides and lactic acid units include, for example, cellulose, cellulose acetate, cellulose nitrate, methyl cellulose, ethyl cellulose, celluloid, viscose rayon, regenerated cellulose, cellophane, cupra, cupraammoniumrayon, cuprofan, Bemberg, hemicellulose, starch, acropectin, dextrin, dextran, glycogen, pectin, chitin, chitosan, gum arabic, guar gum, locust bean gum, acacia gum, and the like and mixtures thereof, and derivatives thereof. Among them, cellulose acetate and ethyl cellulose are preferred.

A method for producing a polylactic acid-based resin containing polyfunctional polysaccharides and lactic units includes a method including reacting the above polyfunctional polysaccharide with the above polylactic acid or lactic acid-other aliphatic hydroxycarboxylic acid copolymer or the like, a method including reacting the above polyfunctional polysaccharide with each of the above lactic acids and a cyclic ester thereof, and the like. The polylactic acid-based resin may be produced by any of the methods. It is desired that the amount of the lactic acid units contained in the above polylactic acid-based resin is at least 50% by mol.

(4) Polylactic Acid-Based Resin Containing Aliphatic Polycarboxylic Acid Unit, Aliphatic Polyhydric Alcohol Unit, and Lactic Acid Unit The aliphatic polycarboxylic acid unit in the polylactic acid-based resin which contains an aliphatic polycarboxylic acid unit, an aliphatic polyhydric alcohol unit, and a lactic acid unit includes, for example, oxalic acid, succinic acid, malonic acid, glutaric acid, adipic acid, pimelic acid, suberic acid, azelaic acid, undecanediacid, dodecanediacid, and the like, and anhydrides thereof. These may be mixtures with acid anhydrides. In addition, the aliphatic polyhydric alcohol unit includes, for example, ethylene glycol, diethylene glycol, triethylene glycol, propylene glycol, dipropylene glycol, 1,3-butanediol, 1,4-butanediol, 3-methyl-1,5-pentanediol, 1,6-hexanediol, 1,9-nonanediol, neopentyl glycol, tetramethylene glycol, 1,4-cyclohexanedimethanol, and the like.

A method for producing a polylactic acid-based resin containing an aliphatic polycarboxylic acid unit, an aliphatic polyhydric alcohol unit, and a lactic acid unit includes a method including reacting the above aliphatic polycarboxylic acid unit and the above aliphatic polyhydric alcohol unit with the above polylactic acid or lactic acid-other aliphatic hydroxycarboxylic acid copolymer or the like, a method including reacting the above aliphatic polycarboxylic acid unit and the above aliphatic polyhydric alcohol unit with each of the above lactic acids and cyclic esters thereof or the like. The polylactic acid-based resin may be produced by any one of the methods. It is preferable that the amount of the lactic acid units contained in the above polylactic acid-based resin is at least 50% by mol.

(5) Mixtures of (1) to (4)

The mixtures of (1) to (4) are not limited in the constitutional proportions so long as the mixture contains a polylactic acid-based resin of the above (1) to (4).

Among these polylactic acid-based resins of (1) to (5), when used in the polylactic acid-based resin composition of the present invention, any of the resins may be utilized, without being particularly limited. (1) The polylactic acid and (2) the lactic acid-other aliphatic hydroxycarboxylic acid copolymer are preferred, and (1) the polylactic acid is more preferred, from the viewpoint of maintaining thermal properties and transparency.

The molecular weight of the polylactic acid-based resin is not particularly limited, and the molecular weight can be properly selected in accordance with the intended applications. As a resin generally speaking, the higher the molecular weight, the higher the physical properties, but more difficult the molding processability; on the other hand, when the molecular weight is lower, the physical properties are worsened even though the molding processability is facilitated. In view of the above point, the molecular weight of the polylactic acid-based resin in the present invention is preferably within the range of preferably from 10,000 to 1,000,000 or so, more preferably from 50,000 to 500,000, and even more preferably from 100,000 to 300,000. Here, the molecular weight of a resin as used herein refers to a weight-average molecular weight unless specified otherwise.

The composition of the present invention may properly contain other biodegradable resins besides the above polylactic acid-based resin, within the range that would not impair the effects of the present invention. Other biodegradable resins include polyethylene succinate, polybutylene succinate, polybutylene succinate adipate, polyethylene terephthalate adipate, polybutylene terephthalate adipate, and the like. The content of the above polylactic acid-based resin is, but not particularly limited to, preferably 70% by mass or more, more preferably 80% by mass or more, even more preferably 90% by mass or more, and even more preferably substantially 100% by mass, of the total mass of the resins constituting the composition.

In the polylactic acid-based resin composition of the present invention, the contents of the polyglycerol fatty acid ester and the polylactic acid-based resin may be properly selected in accordance with the intended applications, and the contents are, but not particularly limited to, in proportions are as follows. It is preferable that the polylactic acid-based resin is from 99.9 to 90% by mass, and that the polyglycerol fatty acid ester is from 0.1 to 10% by mass. It is more preferable that the content of the polylactic acid-based resin is from 99.5 to 95% by mass, and that the content of the polyglycerol fatty acid ester is from 0.5 to 5% by mass, and it is more preferable that the content of the polylactic acid-based resin is from 99.0 to 97.0% by mass, and that the content of the polyglycerol fatty acid ester is from 1.0 to 3.0% by mass, from the viewpoint of impact resistance and molding processability.

The polylactic acid-based resin composition of the present invention may be optionally blended with the following additives within the range that would not impair the effects of the present invention. The additives include anti-blocking agents, lubricants, colorants, anti-static agents, anti-clouding agents, ultraviolet absorbents, thermostabilizers, antioxidants, coloring preventives, antibacterial agents, stabilizers, static agents, crystal nucleating agents, filling agents, pigments, flame retardants, various Fillers, dispersants, and the like.

The anti-blocking agents include silica, calcium carbonate, titania, mica, talc, and the like.

The lubricants include hydrocarbons such as liquid paraffins and polyethylene waxes; fatty acids such as stearic acid; hydroxyfatty acids; fatty acid amides; alkylenebis fatty acid amides; esters formed between fatty acids and lower alcohols; esters formed between fatty acids and polyhydric alcohols; esters formed between fatty acids and polyglycols; aliphatic alcohols; polyhydric alcohols; polyglycols, metal soaps such as calcium stearate, and the like.

The anti-static agents include salts of fatty acids, esters formed between higher alcohols and sulfuric acid, liquid salts of esters formed between aliphatic oils and sulfuric acid, sulfated aliphatic amines and aliphatic amides, phosphoric esters of aliphatic alcohols, sulfonated dibasic fatty acid esters, sulfonic acid salts of aliphatic amides, salts of alkylallylsulfonic acids, salts of aliphatic amines, quaternary ammonium salts, alkylpyridinium salts, polyoxyethylene alkyl ethers, polyoxyethylene alkylphenol ethers, polyoxyethylene alkyl esters, sorbitan alkyl esters, polyoxyethylene sorbitan alkyl esters, imidazoline derivatives, higher alkyl amines and the like.

The anti-clouding agents include glycerol fatty acid esters such as glycerol monostearate, sorbitan fatty acid esters such as sorbitan monolaurate and sorbitan monooleate, polyglycerol fatty acid esters, propylene glycol fatty acid esters, and the like.

The ultraviolet absorbents include benzotriazoles such as 2-(2% hydroxy-5'-methylphenyl)benzotriazole, benzophenones such as 2-hydroxy-4-methoxybenzophenone, salicylic acid derivatives such as p-tert-butylphenyl salicylate, and the like.

The thermostabilizers, the antioxidants, and the coloring preventives include hindered phenolic compounds such as pentaerythritoltetrakis[3-(3,5-di-t-butyl-4-hydroxyphenyl) propionate], phenolic compounds such as paramethoxyphenol, phosphite compounds such as triphenyl phosphite, sulfur-containing compounds such as 2-mercaptobenzimidazole, amine compounds such as phenylnaphthylamine, and the like.

The fillers include barium sulfate, titanium oxide, kaolin, carbon black, and the like.

The flame retardants include halogen-containing compounds such as decabromodiphenyl ether, antimony-containing compounds such as antimony trioxide, and the like.

The polylactic acid-based resin composition of the present invention can be prepared without particular limitations so long as the resin composition contains the polylactic acid-based resin and the impact resistance enhancing agent for a polylactic acid-based resin. For example, the resin composition can be prepared by homogeneously mixing raw materials containing a polylactic acid-based resin and an impact resistance enhancing agent for a polylactic acid-based resin, and optionally other additives with a high-speed agitator or a low-speed agitator, and thereafter thermally melt-kneading the mixture with a single-screw or multiple-screw extruder having sufficient kneading ability.

The method for thermally melt-kneading the mixture is, but not particularly limited to, preferably a method capable of treating continuously for industrial purposes. Specifically, for example, a mixture prepared by mixing a polylactic acid-based resin and an impact resistance enhancing agent for a polylactic acid-based resin mentioned above in a given ratio is melted with a single-screw kneader-extruder or twin-screw kneader-extruder, and the molten mixture can be immediately molded to provide a molded article. A mixture prepared by melt-kneading a polylactic acid-based resin and an impact resistance enhancing agent for a polylactic acid-based resin and optionally other additives with an extruder equipped with a T die is directly extruded and molded into a sheet, a film or the like. Here, in a case where a melt-kneaded mixture is directly molded, a molded article in an amorphous state is usually obtained. Also, crystallization can be promoted by subjecting the molded article to a heat treatment, whereby a crystallized molded article can also be obtained.

In addition, in a molded article in the form of a sheet, a film or the like, a layer having a function such as anti-triboelectric charging, anti-clouding property, adhesiveness, gas barrier property, cohesion, or easy bondability can be formed on a sheet surface as needed. The method for forming these layers include coating methods, laminating methods, and the like.

The coating methods include known methods such as a spray coating method, an air-knife method, a reverse coating method, a kiss coating method, a gravure coating method, a meyer bar method, or a roller-brush method. For example, one side or both sides of a sheet are coated with a coating solution containing an anti-static agent and allowed to dry, and thereby an anti-static layer can be formed. As the laminating method, a known method such as an extrusion-laminating method or a dry laminating method can be used, whereby a film having the above function can be laminated.

A method of forming an adhesive layer includes, for example, a method of applying a coating solution containing an acrylic resin such as a copolymer obtained by copolymerization of other vinyl monomer with an alkyl ester of acrylic acid such as ethyl acrylate, butyl acrylate or 2-ethylhexyl acrylate to a sheet, and drying the coating. The coating solution may be an organic solvent solution of the above copolymer, or an aqueous emulsion.

Since the molded article of the present invention thus obtained is blended with a polyglycerol fatty acid ester in which particular fatty acids are used as constituting fatty acids, the molded article has excellent plasticity, so that impact properties and molding processability can be enhanced while maintaining thermal properties. Also, the molded article of the present invention has a haze as prescribed in JIS standard K7136 of preferably less than 5% because the polyglycerol fatty acid ester is excellently dispersed therein.

EXAMPLES

The present invention will be described hereinbelow on the bases of Examples and Comparative Examples, without intending to limit the scope of the present invention to these Examples and the like.

[Esterification Ratio of Polyglycerol Fatty Acid Ester]

The esterification ratio of the polyglycerol fatty acid ester is calculated on the basis of the formula:

$$\text{Esterification Ratio}(\%) = \frac{\text{Number of mol of Constituting Fatty Acids}}{\text{Number of mol of Total Hydroxyl Groups of the Constituting Polyglycerol}} \times 100(\%)$$

[Average Degree of Polymerization of Polyglycerol]

The average degree of polymerization of the polyglycerol is determined by a hydroxyl value on the basis of the formula:

$$OHV = \frac{56110(n+2)}{(74n+18)}$$

wherein OHV: a hydroxyl value of the polyglycerol, and
n: an average degree of polymerization of the polyglycerol.

Production Example 1 of Polyglycerol Fatty Acid Ester

A mixture of a polyglycerol and constituting fatty acids as listed in any one of Tables 1 to 10, and 12 to 17 was heated at a temperature of from 120° to 260° C. in an inert gas, in the presence of phosphoric acid, p-toluenesulfonic acid, or sodium hydroxide to remove a reaction water to the external of the system, to provide a polyglycerol fatty acid ester.

Examples 1 to 143 and Comparative Examples 1 to 14

A polylactic acid (U'z S-17 manufactured by Toyota Motor Corporation being used for any one of Examples 1 to 81, and Comparative Examples 1 to 10, or Ingeo2002D manufactured by Nature Works being used for Examples 82 to 143 and Comparative Examples 11 to 14) in an amount as listed in any one of Tables 1 to 18 and a polyglycerol fatty acid ester or a modifying agent for a polylactic acid in the kinds and an amount as listed in any one of Tables 1 to 18 were dry-blended, and the mixture was melt-kneaded using a twin-screw extruder attached with a strand die at a cylinder temperature of 200° C. The strands obtained were cooled with water, and pelletized with a pelletizer, thereby obtaining various kinds of polylactic acid-based resin composition pellets. The resulting pellets were dried at 50° C. for 24 hours with a dehumidifying dryer.

Here, the raw materials in any one of Tables 1 to 18 are as follows, the amounts of the fatty acids used being expressed as % by mol of the raw material used for the sake of convenience. For example, the constituting fatty acids in Example 1 are constituted by 50% by mol each of C16 and C18. In other words, equimolar amounts of C16 and C18 were used but other fatty acids are present as impurities in each of the raw materials so that an accurate total amount of C16 and C18, i.e. an accurate total amount of palmitic acid and stearic acid, is calculated to be 99% by mass of the constituting fatty acids, much of impurities of C16 being C18, and much of impurities of C18 being C16. Similarly, the constituting fatty acid in Example 2 being C18 in an amount of 100% by mol refers to a case where C18 alone is used as a raw material fatty acid, and in consideration of other fatty acids that are impurities in the raw materials, an accurate amount of C18, i.e. an accurate amount of stearic acid, is 97% by mass of the constituting fatty acids.

C8: caprylic acid, manufactured by Kao Corporation, purity: 99% by mass;
C10: capric acid, manufactured by Kao Corporation, purity: 99% by mass;
C12: lauric acid, manufactured by Kao Corporation, purity: 99% by mass;
C14: myristic acid, manufactured by Kao Corporation, purity: 99% by mass;
C16: palmitic acid, manufactured by Kao Corporation, purity: 96% by mass;
C18: stearic acid, manufactured by Kao Corporation, purity: 97% by mass;
C18F-1: oleic acid, manufactured by Kao Corporation, purity: 90% by mass;
DAIFATTY-101: adipic ester, manufactured by DAIHACHI CHEMICAL INDUSTRY CO., LTD.;
Plamate PD-150: polylactic acid/diol-dicarboxylic copolymer, manufactured by DIC;
POEM G-002: acetic acid monoglyceride, manufactured by RIKEN VITAMIN CO., LTD.; and
PARAROID BPM-500: manufactured by ROHM and HAAS The resulting pellets were produced into specimens using an injection-molding machine SE-18S, manufactured by Sumitomo Heavy Industries, Ltd. at a cylinder temperature of 200° C. and a mold temperature of 30° C., the specimens including tensile specimens (No. 1(½) of small specimens as prescribed in the accompanying manual 1 of JIS K7113, thickness: 2 mm, length of parallel portion: 30 mm, width of parallel portion: 5 mm, with at both ends: 10 mm), rectangular specimens ($4\times10\times80$ mm$^3$), and small plate specimens ($1\times50\times55$ mm$^3$). Each of the specimens was controlled to conditions of a temperature of 23° C., a relative humidity of 50% and 48 hours or longer before the tests.

Figure 2:
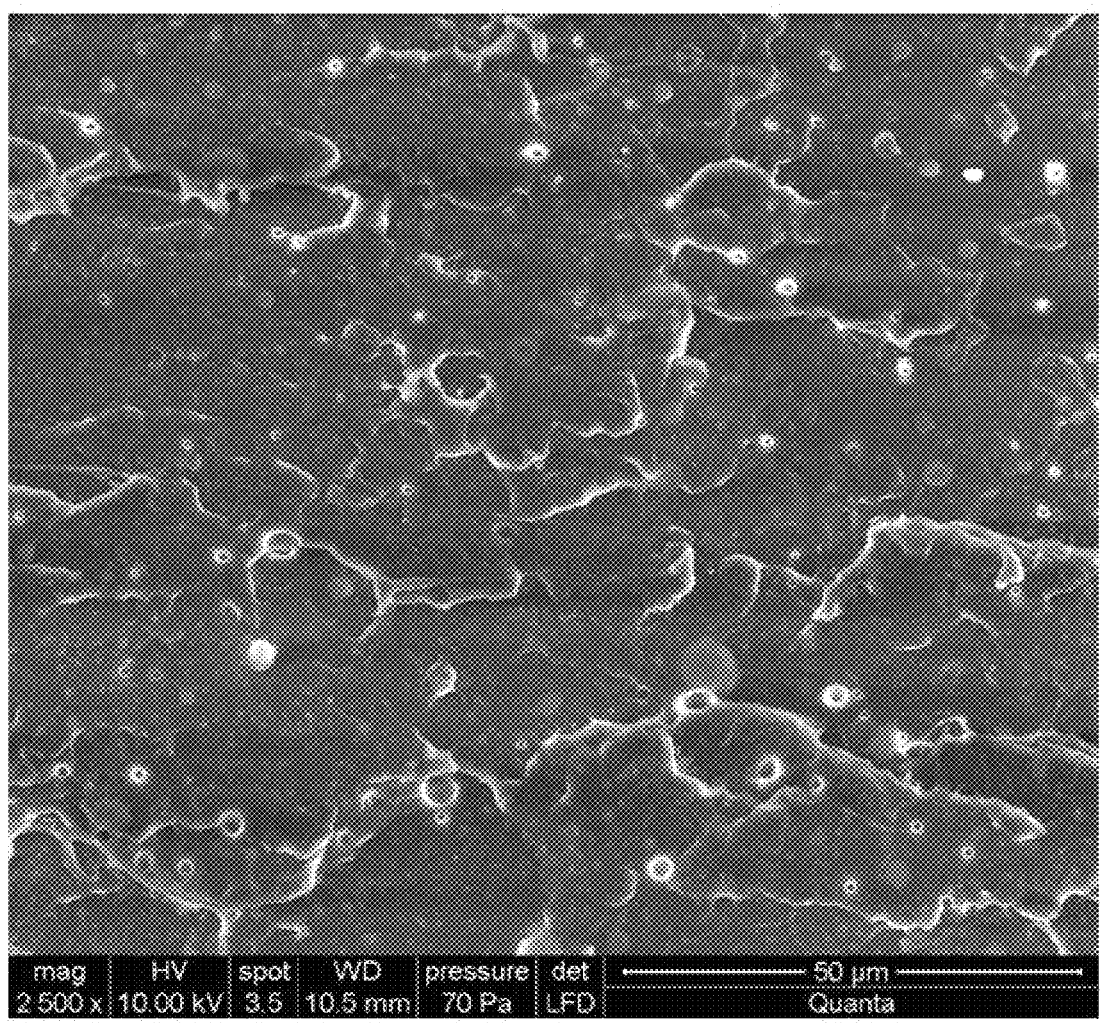
FIG. 2 An SEM photograph of Example 12 at a magnification of 2,500.
Figure 3:
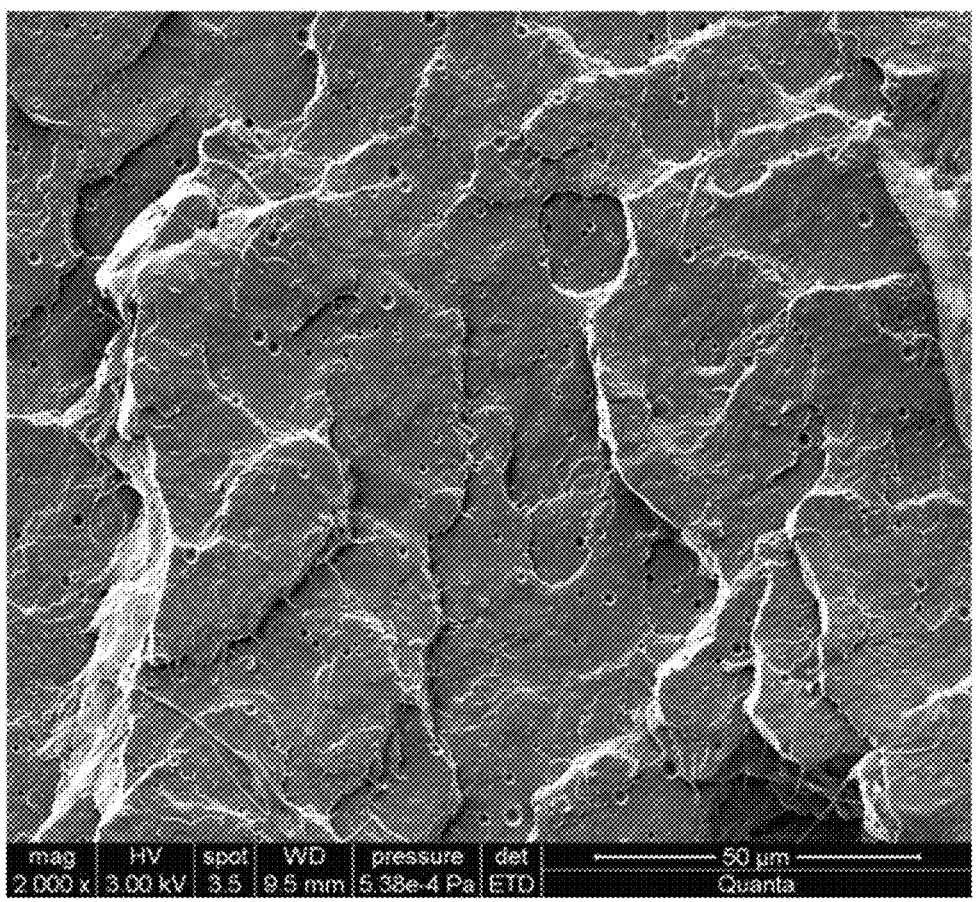
FIG. 3 An SEM photograph of Example 27 at a magnification of 2,000.

The evaluations were made using the specimens obtained in accordance with the following Test Examples 1 to 5. The results are shown in Tables 1 to 18. In addition, the test results of Test Example 5 are shown in FIGS. 1 to 3.

Evaluation 1

Molding Processability

Examples 1 to 143 and Comparative Examples 1 to 14

The molding processability states of the polylactic acid-based resin compositions during the preparation of the polylactic acid-based resin compositions and during the preparation of specimens were observed. As the molding processability, the evaluations of the polylactic acid-based resin compositions were made by three categories of A: bleeding property, B: injection-molding property, and C: finish of molded article. Here, this molding processability for a polylactic acid alone was evaluated as bleeding property of 4, injection-molding property of 5 and finish of molded article of 4, which was nearly preferable as the compositions. From the viewpoint of production of manufactured articles, those satisfying bleeding property of 3 or more, injection-molding property of 3 or more, and finish of molded article of 3 or more are preferred.

A: Bleeding Property

In the preparation of a polylactic acid-based resin composition using a twin-screw extruder, the resin strands during extrusion were visually observed to confirm bleeding property. Since the resin strands were cooled with water, if a polyglycerol fatty acid ester was subject to bleeding, the polyglycerol fatty acid ester would float on a water surface, by which bleeding property can be judged.

[Criteria for Bleeding Property]
4: Bleed-out does not take place.
3: Bleed-out slightly takes place.
2: Bleed-out takes place to a certain extent.
1: Bleed-out takes place in a large amount.

B: Injection-Molding Property

The molding states during injection-molding were observed, and the injection-molding property was evaluated in accordance with the following criteria. Generally, as an injection-molding method for plastics, materials to be injected into a mold are measured while melting in an internal of the injection-molding machine, and the measured materials are injected into a mold. Thereafter, the materials inside the mold are cooled and solidified to give a molded article. In order to obtain molded articles having good external appearance without burrs and sinks, it is necessary to control the molding conditions such as measuring time, injection speed, and holding pressure. Materials having worsened injection-molding property would require enormous labor for controlling these molding conditions. The more labor needed to determine the molding conditions were judged to be poor in the injection-molding property.

[Criteria for Injection-Molding Property]
5: Setting of the molding conditions is easy.
4: Slight labor is needed in setting of the molding conditions, but molding is easy.
3: A certain amount of labor is needed in setting of the molding conditions, but molding can be carried out.
2: Enormous amount of labor is needed in setting of the molding conditions, and molding is difficult.
1: Those cannot be molded.

C: Finish of Molded Article

The impact test specimens obtained by injection-molding were visually observed, and the finish of molded article was evaluated in accordance with the following criteria.

[Criteria for Finish of Molded Article]
4: Those showing equivalent level (of finish) as a molded article of a polylactic acid alone or higher.
3: A molded article surface is observed with slight roughness or slight sinks or the like.
2: A molded article surface is observed with a certain level of roughness or a certain level of sinks or the like.
1: A molded article surface is observed with much roughness or much sinks.

Evaluation 2-1

Impact Properties

Izod Impact Test

Examples 1 to 81 Comparative Examples 1 to 10

The evaluation was carried out using bar test specimens according to Izod impact test (JIS K7110: Plastics—Test Method for Izod Impact Strength). A test was conducted using an impact tester 6546, 2J hammer, manufactured by CEAST, without notches, with an impact direction being edgewise. A relative impact value in a case where an Izod impact value of a case of a polylactic acid alone was defined as 100% was calculated, and the impact property was evaluated. The larger the relative impact value, the more excellent the impact property, and those values of 105% or more are more preferred.

Evaluation 2-2

Impact Properties

DuPont Impact Test

Examples 82 to 143 Comparative Examples 11 to 14

The impact property was evaluated using small plate specimens. Concretely, the evaluation was made according to the following procedures. An instrument used was DuPont free-fall impact tester No. 517 manufactured by YASUDA SEIKI SEISAKUSHO LTD., free-fall height maximum: 100 cm, pitch: 5 cm), with a hitting mold having a diameter of 1 inch, and a receiving platform having a diameter of 1 inch. First, a preliminary test was conducted to deduce a 50% impact energy $E_{50}$ (J) at break, and an actual test was conducted based on the results of the preliminary test to obtain $E_{50}$ (J). The larger the numerical values of the $E_{50}$(J), the more excellent the impact property. Here, the method of the preliminary test, the method of actual test, and the method of calculating $E_{50}$ (J) were carried out in accordance with the methods described in JIS K7211-1(2006), "7.6.2 Preliminary Test," "7.6.3 Test Procedures," and "7.6.4 Indications of Results," respectively.

Evaluation 3

Plasticity

Examples 1 to 81 Comparative Examples 1 to 10

The plasticity was evaluated by calculating tensile stretch in accordance with a tensile test (JIS K7161: Plastics—Testing Method for Tensile Properties). Specifically, tensile specimens prepared according to injection-molding were subjected to a test using a universal material tester Model 5582, manufactured by Instron Japan, under the conditions of a tensile speed of 5 mm/min, and a distance between the grips of 55 mm. In a case where the fracture took place without accompanying the yielding, a measurement value of a tensile strain at break was defined as a tensile stretch (%), and in a case where the fracture took place after the yielding, a measurement value of a nominal tensile strain at break was defined as a tensile stretch (%). The larger the tensile stretch, the more excellent the plasticity. The tensile stretch was calculated in accordance with the following formula.

$$\text{Tensile Stretch (Tensile Strain at Break or Nominal Tensile Strain at Break) (\%)} = \frac{\text{Increased Amount of Distance(mm) Between the Grips Until Specimens Undergo Fracture}}{55(\text{mm})} \times 100(\%)$$

Evaluation 4

Measurement of Glass Transition Temperature (Tg)

Examples 1 to 81 and Comparative Examples 1 to 10

The glass transition temperature (Tg) was measured as prescribed in JIS K7121 (Plastics—Method for Measuring Transition Temperatures) with a differential scanning calorimeter (XRD-DSCII, manufactured by Rigaku) at a heating rate of 20° C./min.

Evaluation 5

Morphology Evaluation

Comparative Example 1, Example 12, and Example 27

The fractured sides of the specimens after the impact test were observed using an environmentally controlled electron microscope Quanta 200, manufactured by FEI, hereinafter referred to as SEM.

TABLE 1

| | Polylactic Acid Amount (% by mass) | Polyglycerol Fatty Acid Ester | | | | | | | | |
|---|---|---|---|---|---|---|---|---|---|---|
| | | Amount (% by mass) | Polyglycerol Average Degree of Polymerization | Fatty Acid (% by mol) | | | | | | Esterification Ratio (%) |
| | | | | C8 | C10 | C12 | C14 | C16 | C18 | C18F-1 | |
| Ex. 1 | 97 | 3 | 2 | — | — | — | — | 50 | 50 | — | 35.0 |

| | Properties | | | | | |
|---|---|---|---|---|---|---|
| | Bleeding Property | Injection-Molding Property | Finish of Molded Article | Relative Impact Value (%) | Tensile Stretch (%) | Tg (° C.) |
| Ex. 1 | 4 | 4 | 4 | 112 | 5.2 | 59.1 |

Note)
C8: caprylic acid, C10: capric acid, C12: lauric acid, C14: myristic acid, C16: palmitic acid, C18: stearic acid, C18F-1: oleic acid.
The components of the constituting fatty acids are expressed by % by mol of the raw materials.

TABLE 2

| | Polylactic Acid Amount (% by mass) | Polyglycerol Fatty Acid Ester | | | | | | | | |
|---|---|---|---|---|---|---|---|---|---|---|
| | | Amount (% by mass) | Polyglycerol Average Degree of Polymerization | Fatty Acid (% by mol) | | | | | | Esterification Ratio (%) |
| | | | | C8 | C10 | C12 | C14 | C16 | C18 | C18F-1 | |
| Ex. 2 | 97 | 3 | 5 | — | — | — | — | — | 100 | — | 35.0 |
| Ex. 3 | 97 | 3 | 5 | — | — | — | — | 50 | 50 | — | 12.0 |
| Ex. 4 | 97 | 3 | 5 | — | — | — | — | 50 | 50 | — | 35.0 |

| | Properties | | | | | |
|---|---|---|---|---|---|---|
| | Bleeding Property | Injection-Molding Property | Finish of Molded Article | Relative Impact Value (%) | Tensile Stretch (%) | Tg (° C.) |
| Ex. 2 | 4 | 3 | 3 | 111 | 8.5 | 58.2 |
| Ex. 3 | 4 | 4 | 4 | 115 | 5.5 | 58.6 |
| Ex. 4 | 4 | 4 | 4 | 118 | 9.2 | 58.3 |

Note)
C8: caprylic acid, C10: capric acid, C12: lauric acid, C14: myristic acid, C16: palmitic acid, C18: stearic acid, C18F-1: oleic acid.
The components of the constituting fatty acids are expressed by % by mol of the raw materials.

TABLE 3

| | Polylactic Acid Amount (% by mass) | Polyglycerol Fatty Acid Ester | | | | | | | | |
|---|---|---|---|---|---|---|---|---|---|---|
| | | Amount (% by mass) | Polyglycerol Average Degree of Polymerization | Fatty Acid (% by mol) | | | | | | Esterification Ratio (%) |
| | | | | C8 | C10 | C12 | C14 | C16 | C18 | C18F-1 | |
| Ex. 5 | 97 | 3 | 10 | — | — | — | — | 100 | — | — | 35.0 |
| Ex. 6 | 90 | 10 | 10 | — | — | — | — | 100 | — | — | 35.0 |
| Ex. 7 | 97 | 3 | 10 | — | — | — | — | — | 100 | — | 35.0 |

TABLE 3-continued

| | Polylactic Acid Amount (% by mass) | Amount (% by mass) | Polyglycerol Average Degree of Polymerization | C8 | C10 | C12 | C14 | C16 | C18 | C18F-1 | Esterification Ratio (%) |
|---|---|---|---|---|---|---|---|---|---|---|---|
| Ex. 8 | 99 | 1 | 10 | — | — | — | — | 50 | 50 | — | 35.0 |
| Ex. 9 | 97 | 3 | 10 | — | — | — | — | 50 | 50 | — | 5.0 |
| Ex. 10 | 97 | 3 | 10 | — | — | — | — | 50 | 50 | — | 20.0 |
| Ex. 11 | 97 | 3 | 10 | — | — | — | — | 50 | 50 | — | 30.0 |
| Ex. 12 | 97 | 3 | 10 | — | — | — | — | 50 | 50 | — | 35.0 |
| Ex. 13 | 97 | 3 | 10 | — | — | — | — | 50 | 50 | — | 45.0 |
| Ex. 14 | 97 | 3 | 10 | — | — | — | — | 50 | 50 | — | 50.0 |
| Ex. 15 | 97 | 3 | 10 | — | — | — | — | 50 | 50 | — | 60.0 |
| Ex. 16 | 95 | 5 | 10 | — | — | — | — | 50 | 50 | — | 35.0 |
| Ex. 17 | 90 | 10 | 10 | — | — | — | — | 50 | 50 | — | 35.0 |
| Ex. 18 | 97 | 3 | 10 | — | — | — | — | 70 | 30 | — | 35.0 |
| Ex. 19 | 97 | 3 | 10 | — | — | — | — | 30 | 70 | — | 35.0 |

| | Properties | | | | | |
|---|---|---|---|---|---|---|
| | Bleeding Property | Injection-Molding Property | Finish of Molded Article | Relative Impact Value (%) | Tensile Stretch (%) | Tg (° C.) |
| Ex. 5 | 4 | 4 | 3 | 112 | 5.1 | 58.3 |
| Ex. 6 | 4 | 3 | 3 | 117 | 7.7 | 58.0 |
| Ex. 7 | 4 | 3 | 3 | 118 | 8.7 | 58.9 |
| Ex. 8 | 4 | 4 | 4 | 122 | 7.8 | 59.7 |
| Ex. 9 | 4 | 4 | 4 | 114 | 5.2 | 58.0 |
| Ex. 10 | 4 | 4 | 4 | 116 | 5.5 | 58.0 |
| Ex. 11 | 4 | 4 | 4 | 120 | 8.2 | 58.0 |
| Ex. 12 | 4 | 5 | 4 | 128 | 12.1 | 58.5 |
| Ex. 13 | 4 | 4 | 4 | 132 | 12.3 | 59.0 |
| Ex. 14 | 3 | 4 | 4 | 135 | 10.5 | 60.0 |
| Ex. 15 | 3 | 4 | 3 | 137 | 10.2 | 60.0 |
| Ex. 16 | 4 | 3 | 4 | 131 | 12.1 | 58.3 |
| Ex. 17 | 4 | 3 | 4 | 135 | 13.1 | 58.2 |
| Ex. 18 | 4 | 4 | 4 | 125 | 12.9 | 58.6 |
| Ex. 19 | 4 | 4 | 4 | 126 | 11.5 | 58.5 |

Note)
C8: caprylic acid, C10: capric acid, C12: lauric acid, C14: myristic acid, C16: palmitic acid, C18: stearic acid, C18F-1: oleic acid.
The components of the constituting fatty acids are expressed by % by mol of the raw materials.

TABLE 4

| | Polylactic Acid Amount (% by mass) | Polyglycerol Fatty Acid Ester | | | | | | | | | |
|---|---|---|---|---|---|---|---|---|---|---|---|
| | | Amount (% by mass) | Polyglycerol Average Degree of Polymerization | Fatty Acid (% by mol) | | | | | | | Esterification Ratio (%) |
| | | | | C8 | C10 | C12 | C14 | C16 | C18 | C18F-1 | |
| Ex. 20 | 97 | 3 | 10 | — | — | 100 | — | — | — | — | 7.0 |
| Ex. 21 | 97 | 3 | 10 | — | — | 100 | — | — | — | — | 35.0 |
| Ex. 22 | 97 | 3 | 10 | — | — | 100 | — | — | — | — | 70.0 |
| Ex. 23 | 99 | 1 | 10 | — | — | — | — | — | — | 100 | 35.0 |
| Ex. 24 | 90 | 10 | 10 | — | — | — | — | — | — | 100 | 35.0 |
| Ex. 25 | 97 | 3 | 10 | — | — | — | — | — | — | 100 | 5.0 |
| Ex. 26 | 97 | 3 | 10 | — | — | — | — | — | — | 100 | 30.0 |
| Ex. 27 | 97 | 3 | 10 | — | — | — | — | — | — | 100 | 35.0 |
| Ex. 28 | 97 | 3 | 10 | — | — | — | — | — | — | 100 | 45.0 |
| Ex. 29 | 97 | 3 | 10 | — | — | — | — | — | — | 100 | 65.0 |
| Ex. 30 | 97 | 3 | 10 | — | — | — | — | — | — | 100 | 70.0 |

| | Properties | | | | | |
|---|---|---|---|---|---|---|
| | Bleeding Property | Injection-Molding Property | Finish of Molded Article | Relative Impact Value (%) | Tensile Stretch (%) | Tg (° C.) |
| Ex. 20 | 4 | 4 | 3 | 111 | 6.4 | 58.0 |
| Ex. 21 | 4 | 4 | 3 | 113 | 13.7 | 58.1 |
| Ex. 22 | 4 | 3 | 3 | 125 | 47.3 | 58.5 |
| Ex. 23 | 4 | 4 | 4 | 113 | 10.9 | 58.9 |
| Ex. 24 | 4 | 3 | 3 | 128 | 22.4 | 57.3 |
| Ex. 25 | 4 | 4 | 3 | 113 | 5.2 | 57.0 |
| Ex. 26 | 4 | 4 | 3 | 118 | 10.2 | 57.5 |
| Ex. 27 | 4 | 4 | 4 | 122 | 40.8 | 58.0 |

TABLE 4-continued

|  |  |  |  |  |  |  |
|---|---|---|---|---|---|---|
| Ex. 28 | 4 | 4 | 3 | 123 | 41.5 | 58.5 |
| Ex. 29 | 4 | 4 | 3 | 125 | 42.2 | 58.5 |
| Ex. 30 | 3 | 3 | 3 | 129 | 44.1 | 58.6 |

Note)
C8: caprylic acid, C10: capric acid, C12: lauric acid, C14: myristic acid, C16: palmitic acid, C18: stearic acid, C18F-1: oleic acid.
The components of the constituting fatty acids are expressed by % by mol of the raw materials.

TABLE 5

|  | Polylactic Acid Amount (% by mass) | Polyglycerol Fatty Acid Ester | | | | | | | | |
|---|---|---|---|---|---|---|---|---|---|---|
|  |  | Amount (% by mass) | Polyglycerol Average Degree of Polymerization | Fatty Acid (% by mol) | | | | | | Esterification Ratio (%) |
|  |  |  |  | C8 | C10 | C12 | C14 | C16 | C18 | C18F-1 |  |
| Ex. 31 | 97 | 3 | 10 | — | — | — | — | 50 | — | 50 | 35.0 |
| Ex. 32 | 97 | 3 | 10 | — | — | — | — | 25 | 25 | 50 | 5.0 |
| Ex. 33 | 97 | 3 | 10 | — | — | — | — | 25 | 25 | 50 | 30.0 |
| Ex. 34 | 97 | 3 | 10 | — | — | — | — | 25 | 25 | 50 | 35.0 |
| Ex. 35 | 97 | 3 | 10 | — | — | — | — | 25 | 25 | 50 | 45.0 |
| Ex. 36 | 97 | 3 | 10 | — | — | — | — | 25 | 25 | 50 | 65.0 |
| Ex. 37 | 97 | 3 | 10 | — | — | — | — | 25 | 25 | 50 | 70.0 |
| Ex. 38 | 97 | 3 | 10 | — | — | — | — | 25 | 25 | 50 | 80.0 |
| Ex. 39 | 97 | 3 | 10 | — | — | — | — | — | 50 | 50 | 35.0 |

|  | Properties | | | | | |
|---|---|---|---|---|---|---|
|  | Bleeding Property | Injection-Molding Property | Finish of Molded Article | Relative Impact Value (%) | Tensile Stretch (%) | Tg (° C.) |
| Ex. 31 | 4 | 4 | 3 | 112 | 5.7 | 58.0 |
| Ex. 32 | 4 | 4 | 4 | 110 | 6.8 | 57.0 |
| Ex. 33 | 4 | 4 | 4 | 117 | 14.2 | 57.5 |
| Ex. 34 | 4 | 5 | 4 | 128 | 22.5 | 58.0 |
| Ex. 35 | 4 | 4 | 3 | 129 | 27.5 | 58.5 |
| Ex. 36 | 4 | 4 | 3 | 132 | 32.2 | 58.5 |
| Ex. 37 | 4 | 3 | 3 | 136 | 35.2 | 58.6 |
| Ex. 38 | 3 | 3 | 3 | 135 | 33.4 | 58.8 |
| Ex. 39 | 4 | 5 | 4 | 125 | 20.7 | 58.3 |

Note)
C8: caprylic acid, C10: capric acid, C12: lauric acid, C14: myristic acid, C16: palmitic acid, C18: stearic acid, C18F-1: oleic acid.
The components of the constituting fatty acids are expressed by % by mol of the raw materials.

TABLE 6

|  | Polylactic Acid Amount (% by mass) | Polyglycerol Fatty Acid Ester | | | | | | | | |
|---|---|---|---|---|---|---|---|---|---|---|
|  |  | Amount (% by mass) | Polyglycerol Average Degree of Polymerization | Fatty Acid (% by mol) | | | | | | Esterification Ratio (%) |
|  |  |  |  | C8 | C10 | C12 | C14 | C16 | C18 | C18F-1 |  |
| Ex. 40 | 97 | 3 | 10 | — | — | 50 | — | 50 | — | — | 35.0 |
| Ex. 41 | 97 | 3 | 10 | — | — | 50 | — | — | 50 | — | 35.0 |
| Ex. 42 | 97 | 3 | 10 | — | — | 50 | — | 25 | 25 | — | 5.0 |
| Ex. 43 | 97 | 3 | 10 | — | — | 50 | — | 25 | 25 | — | 35.0 |
| Ex. 44 | 97 | 3 | 10 | — | — | 50 | — | 25 | 25 | — | 45.0 |
| Ex. 45 | 97 | 3 | 10 | — | — | 50 | — | 25 | 25 | — | 50.0 |
| Ex. 46 | 97 | 3 | 10 | — | — | 50 | — | 25 | 25 | — | 65.0 |
| Ex. 47 | 97 | 3 | 10 | — | — | 50 | — | 25 | 25 | — | 70.0 |
| Ex. 48 | 97 | 3 | 10 | — | — | 50 | — | — | 50 | — | 70.0 |
| Ex. 49 | 97 | 3 | 10 | — | — | 70 | — | 15 | 15 | — | 70.0 |

TABLE 6-continued

| | Bleeding Property | Injection-Molding Property | Finish of Molded Article | Relative Impact Value (%) | Tensile Stretch (%) | Tg (° C.) |
|---|---|---|---|---|---|---|
| Ex. 40 | 4 | 4 | 3 | 115 | 6.7 | 58.1 |
| Ex. 41 | 4 | 4 | 3 | 118 | 8.7 | 58.8 |
| Ex. 42 | 4 | 4 | 4 | 115 | 5.0 | 58.2 |
| Ex. 43 | 4 | 4 | 4 | 119 | 9.8 | 58.2 |
| Ex. 44 | 4 | 4 | 4 | 121 | 18.9 | 58.5 |
| Ex. 45 | 4 | 5 | 4 | 125 | 20.6 | 58.3 |
| Ex. 46 | 4 | 4 | 3 | 130 | 20.2 | 58.9 |
| Ex. 47 | 3 | 3 | 3 | 144 | 37.3 | 58.9 |
| Ex. 48 | 3 | 3 | 3 | 133 | 34.4 | 59.1 |
| Ex. 49 | 3 | 3 | 3 | 138 | 55.2 | 58.1 |

Note)
C8: caprylic acid, C10: capric acid, C12: lauric acid, C14: myristic acid, C16: palmitic acid, C18: stearic acid, C18F-1: oleic acid.
The components of the constituting fatty acids are expressed by % by mol of the raw materials.

TABLE 7

| | Polylactic Acid Amount (% by mass) | Polyglycerol Fatty Acid Ester | | | | | | | | |
|---|---|---|---|---|---|---|---|---|---|---|
| | | Amount (% by mass) | Polyglycerol Average Degree of Polymerization | Fatty Acid (% by mol) | | | | | | Esterification Ratio (%) |
| | | | | C8 | C10 | C12 | C14 | C16 | C18 | C18F-1 | |
| Ex. 50 | 97 | 3 | 38 | — | — | — | 100 | — | — | — | 35.0 |
| Ex. 51 | 97 | 3 | 38 | — | — | — | 50 | 50 | — | — | 35.0 |
| Ex. 52 | 97 | 3 | 38 | — | — | — | 50 | — | 50 | — | 35.0 |
| Ex. 53 | 97 | 3 | 38 | — | — | — | 50 | 25 | 25 | — | 35.0 |
| Ex. 54 | 97 | 3 | 38 | — | — | — | — | 100 | — | — | 35.0 |
| Ex. 55 | 97 | 3 | 38 | — | — | — | — | — | 100 | — | 35.0 |
| Ex. 56 | 97 | 3 | 38 | — | — | — | — | 50 | 50 | — | 5.0 |
| Ex. 57 | 97 | 3 | 38 | — | — | — | — | 50 | 50 | — | 30.0 |
| Ex. 58 | 97 | 3 | 38 | — | — | — | — | 50 | 50 | — | 35.0 |
| Ex. 59 | 97 | 3 | 38 | — | — | — | — | 50 | 50 | — | 50.0 |
| Ex. 60 | 97 | 3 | 38 | — | — | — | — | 50 | 50 | — | 60.0 |

| | Bleeding Property | Injection-Molding Property | Finish of Molded Article | Relative Impact Value (%) | Tensile Stretch (%) | Tg (° C.) |
|---|---|---|---|---|---|---|
| Ex. 50 | 4 | 3 | 3 | 110 | 5.1 | 58.3 |
| Ex. 51 | 4 | 3 | 3 | 114 | 12.3 | 58.1 |
| Ex. 52 | 4 | 3 | 3 | 116 | 12.4 | 58.9 |
| Ex. 53 | 4 | 4 | 3 | 115 | 12.3 | 58.9 |
| Ex. 54 | 4 | 3 | 3 | 112 | 5.1 | 58.3 |
| Ex. 55 | 4 | 3 | 3 | 114 | 10.3 | 58.9 |
| Ex. 56 | 4 | 4 | 3 | 107 | 5.2 | 58.0 |
| Ex. 57 | 4 | 4 | 3 | 113 | 5.8 | 58.0 |
| Ex. 58 | 4 | 4 | 3 | 115 | 9.8 | 58.8 |
| Ex. 59 | 4 | 4 | 3 | 120 | 11.2 | 58.6 |
| Ex. 60 | 4 | 3 | 3 | 128 | 11.8 | 58.6 |

Note)
C8: caprylic acid, C10: capric acid, C12: lauric acid, C14: myristic acid, C16: palmitic acid, C18: stearic acid, C18F-1: oleic acid.
The components of the constituting fatty acids are expressed by % by mol of the raw materials.

TABLE 8

| | Polylactic Acid Amount (% by mass) | Polyglycerol Fatty Acid Ester | | | | | | | | |
|---|---|---|---|---|---|---|---|---|---|---|
| | | Amount (% by mass) | Polyglycerol Average Degree of Polymerization | Fatty Acid (% by mol) | | | | | | Esterification Ratio (%) |
| | | | | C8 | C10 | C12 | C14 | C16 | C18 | C18F-1 | |
| Ex. 61 | 97 | 3 | 38 | 100 | — | — | — | — | — | — | 70.0 |
| Ex. 62 | 97 | 3 | 38 | — | 100 | — | — | — | — | — | 70.0 |

TABLE 8-continued

| | | | | | | | | | | | |
|---|---|---|---|---|---|---|---|---|---|---|---|
| Ex. 63 | 97 | 3 | 38 | 50 | 50 | — | — | — | — | — | 70.0 |
| Ex. 64 | 97 | 3 | 38 | 50 | — | 50 | — | — | — | — | 70.0 |
| Ex. 65 | 97 | 3 | 38 | — | 50 | 50 | — | — | — | — | 70.0 |
| Ex. 66 | 97 | 3 | 38 | — | — | 50 | — | 25 | 25 | — | 20.0 |
| Ex. 67 | 97 | 3 | 38 | — | — | 50 | — | 25 | 25 | — | 35.0 |
| Ex. 68 | 97 | 3 | 38 | — | — | 50 | — | 25 | 25 | — | 50.0 |
| Ex. 69 | 97 | 3 | 38 | — | — | 50 | — | 25 | 25 | — | 60.0 |
| Ex. 70 | 97 | 3 | 38 | — | — | 100 | — | — | — | — | 30.0 |
| Ex. 71 | 97 | 3 | 38 | — | — | 100 | — | — | — | — | 50.0 |
| Ex. 72 | 97 | 3 | 38 | — | — | 100 | — | — | — | — | 70.0 |
| Ex. 73 | 97 | 3 | 38 | — | — | 100 | — | — | — | — | 75.0 |
| Ex. 74 | 97 | 3 | 38 | — | — | 100 | — | — | — | — | 80.0 |

| | Properties | | | | | |
|---|---|---|---|---|---|---|
| | Bleeding Property | Injection-Molding Property | Finish of Molded Article | Relative Impact Value (%) | Tensile Stretch (%) | Tg (° C.) |
| Ex. 61 | 3 | 4 | 3 | 116 | 5.2 | 56.8 |
| Ex. 62 | 3 | 4 | 3 | 130 | 27.1 | 57.2 |
| Ex. 63 | 3 | 4 | 3 | 112 | 15.3 | 56.5 |
| Ex. 64 | 3 | 4 | 3 | 127 | 22.1 | 56.9 |
| Ex. 65 | 3 | 4 | 3 | 132 | 29.1 | 57.4 |
| Ex. 66 | 4 | 3 | 3 | 107 | 13.3 | 57.5 |
| Ex. 67 | 4 | 3 | 3 | 115 | 12.3 | 57.6 |
| Ex. 68 | 3 | 3 | 3 | 118 | 24.1 | 57.6 |
| Ex. 69 | 3 | 3 | 3 | 120 | 26.1 | 58.1 |
| Ex. 70 | 4 | 4 | 3 | 112 | 6.2 | 58.0 |
| Ex. 71 | 4 | 4 | 3 | 116 | 14.5 | 58.4 |
| Ex. 72 | 3 | 4 | 3 | 128 | 27.5 | 58.2 |
| Ex. 73 | 3 | 4 | 3 | 130 | 30.0 | 58.2 |
| Ex. 74 | 3 | 3 | 3 | 134 | 32.0 | 58.0 |

Note)
C8: caprylic acid, C10: capric acid, C12: lauric acid, C14: myristic acid, C16: palmitic acid, C18: stearic acid, C18F-1: oleic acid.
The components of the constituting fatty acids are expressed by % by mol of the raw materials.

TABLE 9

| | Polylactic Acid Amount (% by mass) | Polyglycerol Fatty Acid Ester | | | | | | | | |
|---|---|---|---|---|---|---|---|---|---|---|
| | | Amount (% by mass) | Polyglycerol Average Degree of Polymerization | Fatty Acid (% by mol) | | | | | | Esterification Ratio (%) |
| | | | | C8 | C10 | C12 | C14 | C16 | C18 | C18F-1 | |
| Ex. 75 | 97 | 3 | 38 | — | — | — | 50 | — | — | 50 | 35.0 |
| Ex. 76 | 97 | 3 | 38 | — | — | — | — | — | — | 100 | 5.0 |
| Ex. 77 | 97 | 3 | 38 | — | — | — | — | — | — | 100 | 30.0 |
| Ex. 78 | 97 | 3 | 38 | — | — | — | — | — | — | 100 | 35.0 |
| Ex. 79 | 97 | 3 | 38 | — | — | — | — | — | — | 100 | 40.0 |
| Ex. 80 | 97 | 3 | 38 | — | — | — | — | — | — | 100 | 50.0 |
| Ex. 81 | 97 | 3 | 38 | — | — | — | — | — | — | 100 | 60.0 |

| | Properties | | | | | |
|---|---|---|---|---|---|---|
| | Bleeding Property | Injection-Molding Property | Finish of Molded Article | Relative Impact Value (%) | Tensile Stretch (%) | Tg (° C.) |
| Ex. 75 | 4 | 4 | 3 | 118 | 14.0 | 57.9 |
| Ex. 76 | 4 | 4 | 4 | 110 | 5.2 | 57.8 |
| Ex. 77 | 4 | 4 | 4 | 112 | 11.0 | 58.0 |
| Ex. 78 | 4 | 4 | 4 | 115 | 14.0 | 58.4 |
| Ex. 79 | 4 | 4 | 3 | 116 | 16.3 | 58.6 |
| Ex. 80 | 4 | 4 | 3 | 128 | 22.8 | 58.3 |
| Ex. 81 | 4 | 3 | 3 | 132 | 24.0 | 58.3 |

Note)
C8: caprylic acid, C10: capric acid, C12: lauric acid, C14: myristic acid, C16: palmitic acid, C18: stearic acid, C18F-1: oleic acid.
The components of the constituting fatty acids are expressed by % by mol of the raw materials.

TABLE 10

| | Polylactic Acid Amount (% by mass) | Amount (% by mass) | Polyglycerol Average Degree of Polymerization | \multicolumn{7}{c|}{Fatty Acid (% by mol)} | Esterification Ratio (%) |
|---|---|---|---|---|---|---|---|---|---|---|---|
| | | | | C8 | C10 | C12 | C14 | C16 | C18 | C18F-1 | |
| Comp. Ex. 1 | 100 | 0 | — | — | — | — | — | — | — | — | — |
| Comp. Ex. 2 | 97 | 3 | 1 | — | — | — | — | 50 | 50 | — | 35.0 |
| Comp. Ex. 3 | 97 | 3 | 1 | — | — | 50 | — | — | 50 | — | 50.0 |
| Comp. Ex. 4 | 97 | 3 | 1 | — | — | — | — | — | 100 | — | 33.0 |

| | Properties | | | | | |
|---|---|---|---|---|---|---|
| | Bleeding Property | Injection-Molding Property | Finish of Molded Article | Relative Impact Value (%) | Tensile Stretch (%) | Tg (° C.) |
| Comp. Ex. 1 | 4 | 5 | 4 | 100 | 3.8 | 60.8 |
| Comp. Ex. 2 | 4 | 4 | 3 | 98 | 4.5 | 54.5 |
| Comp. Ex. 3 | 4 | 4 | 3 | 104 | 4.2 | 53.4 |
| Comp. Ex. 4 | 4 | 4 | 3 | 102 | 4.3 | 54.8 |

Note)
C8: caprylic acid, C10: capric acid, C12: lauric acid, C14: myristic acid, C16: palmitic acid, C18: stearic acid, C18F-1: oleic acid.
The components of the constituting fatty acids are expressed by % by mol of the raw materials.

TABLE 11

| | Polylactic Acid | Modifying Agent for Polylactic Acid-Based Resin | | Properties | | | | | |
|---|---|---|---|---|---|---|---|---|---|
| | Amount (% by mass) | Amount (% by mass) | Kinds | Bleeding Property | Injection-Molding Property | Finish of Molded Article | Relative Impact Value (%) | Tensile Stretch (%) | Tg (° C.) |
| Comp. Ex. 5 | 95 | 5 | DAIFATTY-101 | 4 | 3 | 3 | 101 | 2.2 | 49.5 |
| Comp. Ex. 6 | 90 | 10 | DAIFATTY-101 | 2 | 3 | 3 | 102 | 3.1 | 43.7 |
| Comp. Ex. 7 | 95 | 5 | Plamate PD-150 | 4 | 5 | 4 | 99 | 9.9 | 58.8 |
| Comp. Ex. 8 | 90 | 10 | Plamate PD-150 | 4 | 5 | 4 | 98 | 11.5 | 59.7 |
| Comp. Ex. 9 | 85 | 15 | Plamate PD-150 | 4 | 5 | 4 | 100 | 13.8 | 59.4 |
| Comp. Ex. 10 | 95 | 5 | POEM G-002 | 4 | 4 | 3 | 104 | 4.8 | 47.7 |

TABLE 12

| | Polylactic Acid Amount (% by mass) | Amount (% by mass) | Polyglycerol Average Degree of Polymerization | \multicolumn{7}{c|}{Fatty Acid (% by mol)} | Esterification Ratio (%) | Properties | | | |
|---|---|---|---|---|---|---|---|---|---|---|---|---|---|---|---|
| | | | | C8 | C10 | C12 | C14 | C16 | C18 | C18F-1 | | Bleeding Property | Injection-Molding Property | Finish of Molded Article | Energy (J) at 50% Fracture |
| Ex. 82 | 97 | 3 | 2 | — | — | 100 | — | — | — | — | 82.0 | 4 | 4 | 4 | 0.30 |
| Ex. 83 | 97 | 3 | 2 | — | — | 100 | — | — | — | — | 86.0 | 4 | 4 | 4 | 0.51 |

TABLE 12-continued

| | Poly-lactic Acid Amount (% by mass) | Polyglycerol Fatty Acid Ester | | | | | | | | Esterification Ratio (%) | Properties | | | |
|---|---|---|---|---|---|---|---|---|---|---|---|---|---|---|
| | | Amount (% by mass) | Polyglycerol Average Degree of Polymerization | Fatty Acid (% by mol) | | | | | | | Bleeding Property | Injection-Molding Property | Finish of Molded Article | Energy (J) at 50% Fracture |
| | | | | C8 | C10 | C12 | C14 | C16 | C18 | C18F-1 | | | | | |
| Ex. 84 | 97 | 3 | 2 | — | — | 100 | — | — | — | — | 90.0 | 4 | 4 | 4 | 0.62 |
| Ex. 85 | 97 | 3 | 2 | — | — | — | — | 50 | 50 | — | 30.0 | 4 | 4 | 4 | 0.51 |
| Ex. 86 | 97 | 3 | 2 | — | — | — | — | 50 | 50 | — | 35.0 | 4 | 4 | 4 | 0.55 |
| Ex. 87 | 97 | 3 | 2 | — | — | — | — | 50 | 50 | — | 45.0 | 3 | 5 | 4 | 1.20 |
| Ex. 88 | 97 | 3 | 2 | — | — | — | — | 50 | 50 | — | 50.0 | 3 | 5 | 4 | 1.91 |
| Ex. 89 | 97 | 3 | 2 | — | — | — | — | 50 | 50 | — | 55.0 | 3 | 5 | 4 | 2.48 |
| Ex. 90 | 97 | 3 | 2 | — | — | — | — | 50 | 50 | — | 60.0 | 3 | 4 | 3 | 2.55 |
| Ex. 91 | 97 | 3 | 2 | — | — | — | — | 50 | 50 | — | 65.0 | 3 | 4 | 3 | 2.58 |
| Ex. 92 | 97 | 3 | 2 | — | — | — | — | 50 | 50 | — | 70.0 | 3 | 3 | 3 | 2.55 |
| Ex. 93 | 97 | 3 | 2 | — | — | — | — | — | — | 100 | 45.0 | 3 | 4 | 4 | 0.51 |
| Ex. 94 | 97 | 3 | 2 | — | — | 14 | 6 | 34 | 26 | 20 | 66.0 | 3 | 4 | 4 | 1.20 |

Note)
C8: caprylic acid, C10: capric acid, C12: lauric acid, C14: myristic acid, C16: palmitic acid, C18: stearic acid, C18F-1: oleic acid.
The components of the constituting fatty acids are expressed by % by mol of the raw materials.

TABLE 13

| | Poly-lactic Acid Amount (% by mass) | Polyglycerol Fatty Acid Ester | | | | | | | | Esterification Ratio (%) | Properties | | | |
|---|---|---|---|---|---|---|---|---|---|---|---|---|---|---|
| | | Amount (% by mass) | Polyglycerol Average Degree of Polymerization | Fatty Acid (% by mol) | | | | | | | Bleeding Property | Injection-Molding Property | Finish of Molded Article | Energy (J) at 50% Fracture |
| | | | | C8 | C10 | C12 | C14 | C16 | C18 | C18F-1 | | | | | |
| Ex. 95  | 97 | 3 | 3 | — | — | 100 | — | — | — | — | 40.0  | 4 | 4 | 4 | 0.51 |
| Ex. 96  | 97 | 3 | 3 | — | — | 100 | — | — | — | — | 50.0  | 4 | 4 | 4 | 0.68 |
| Ex. 97  | 97 | 3 | 3 | — | — | 100 | — | — | — | — | 78.0  | 4 | 4 | 4 | 0.74 |
| Ex. 98  | 97 | 3 | 3 | — | — | 100 | — | — | — | — | 90.0  | 4 | 4 | 4 | 3.43 |
| Ex. 99  | 97 | 3 | 3 | — | — | 100 | — | — | — | — | 100.0 | 4 | 3 | 3 | 3.44 |
| Ex. 100 | 97 | 3 | 3 | — | — | — | — | 50 | 50 | — | 30.0  | 3 | 4 | 4 | 0.59 |
| Ex. 101 | 97 | 3 | 3 | — | — | — | — | 50 | 50 | — | 35.0  | 3 | 4 | 4 | 0.68 |
| Ex. 102 | 97 | 3 | 3 | — | — | — | — | 50 | 50 | — | 45.0  | 3 | 5 | 4 | 1.72 |
| Ex. 103 | 97 | 3 | 3 | — | — | — | — | 50 | 50 | — | 47.5  | 3 | 5 | 4 | 2.21 |
| Ex. 104 | 97 | 3 | 3 | — | — | — | — | 50 | 50 | — | 50.0  | 3 | 4 | 3 | 2.40 |
| Ex. 105 | 97 | 3 | 3 | — | — | — | — | 50 | 50 | — | 65.0  | 3 | 4 | 3 | 2.62 |
| Ex. 106 | 97 | 3 | 3 | — | — | — | — | 50 | 50 | — | 70.0  | 3 | 3 | 3 | 2.80 |

Note)
C8: caprylic acid, C10: capric acid, C12: lauric acid, C14: myristic acid, C16: palmitic acid, C18: stearic acid, C18F-1: oleic acid.
The components of the constituting fatty acids are expressed by % by mol of the raw materials.

TABLE 14

| | Poly-lactic Acid Amount (% by mass) | Polyglycerol Fatty Acid Ester | | | | | | | | Esterification Ratio (%) | Properties | | | |
|---|---|---|---|---|---|---|---|---|---|---|---|---|---|---|
| | | Amount (% by mass) | Polyglycerol Average Degree of Polymerization | Fatty Acid (% by mol) | | | | | | | Bleeding Property | Injection-Molding Property | Finish of Molded Article | Energy (J) at 50% Fracture |
| | | | | C8 | C10 | C12 | C14 | C16 | C18 | C18F-1 | | | | | |
| Ex. 107 | 97 | 3 | 3 | — | — | — | — | — | — | 100 | 45.0 | 3 | 4 | 4 | 0.56 |
| Ex. 108 | 97 | 3 | 3 | — | — | 14 | 6 | 34 | 26 | 20 | 30.0 | 3 | 4 | 4 | 0.47 |
| Ex. 109 | 97 | 3 | 3 | — | — | 14 | 6 | 34 | 26 | 20 | 40.0 | 3 | 4 | 4 | 1.56 |
| Ex. 110 | 97 | 3 | 3 | — | — | 14 | 6 | 34 | 26 | 20 | 66.0 | 3 | 5 | 4 | 2.26 |
| Ex. 111 | 97 | 3 | 3 | — | — | 14 | 6 | 34 | 26 | 20 | 80.0 | 3 | 4 | 3 | 2.50 |

TABLE 14-continued

| | Poly-lactic Acid Amount (% by mass) | Polyglycerol Fatty Acid Ester | | | | | | | | Esterification Ratio (%) | Properties | | | |
|---|---|---|---|---|---|---|---|---|---|---|---|---|---|---|
| | | Amount (% by mass) | Polyglycerol Average Degree of Polymerization | Fatty Acid (% by mol) | | | | | | | Bleeding Property | Injection-Molding Property | Finish of Molded Article | Energy (J) at 50% Fracture |
| | | | | C8 | C10 | C12 | C14 | C16 | C18 | C18F-1 | | | | | |
| Ex. 112 | 97 | 3 | 3 | — | — | 14 | 6 | 34 | 26 | 20 | 90.0 | 3 | 3 | 3 | 2.80 |
| Ex. 113 | 97 | 3 | 3 | — | — | 30 | 6 | 34 | 26 | 4 | 66.0 | 3 | 3 | 3 | 2.05 |

Note)
C8: caprylic acid, C10: capric acid, C12: lauric acid, C14: myristic acid, C16: palmitic acid, C18: stearic acid, C18F-1: oleic acid.
The components of the constituting fatty acids are expressed by % by mol of the raw materials.

TABLE 15

| | Poly-lactic Acid Amount (% by mass) | Polyglycerol Fatty Acid Ester | | | | | | | | Esterification Ratio (%) | Properties | | | |
|---|---|---|---|---|---|---|---|---|---|---|---|---|---|---|
| | | Amount (% by mass) | Polyglycerol Average Degree of Polymerization | Fatty Acid (% by mol) | | | | | | | Bleeding Property | Injection-Molding Property | Finish of Molded Article | Energy (J) at 50% Fracture |
| | | | | C8 | C10 | C12 | C14 | C16 | C18 | C18F-1 | | | | | |
| Ex. 114 | 97 | 3 | 4 | — | — | 100 | — | — | — | — | 40.0 | 4 | 4 | 4 | 0.51 |
| Ex. 115 | 97 | 3 | 4 | — | — | 100 | — | — | — | — | 50.0 | 4 | 4 | 4 | 1.20 |
| Ex. 116 | 97 | 3 | 4 | — | — | 100 | — | — | — | — | 60.0 | 4 | 4 | 4 | 2.32 |
| Ex. 117 | 97 | 3 | 4 | — | — | 100 | — | — | — | — | 78.0 | 4 | 4 | 4 | 3.19 |
| Ex. 118 | 97 | 3 | 4 | — | — | 100 | — | — | — | — | 90.0 | 4 | 3 | 4 | 3.38 |
| Ex. 119 | 97 | 3 | 4 | — | — | 100 | — | — | — | — | 100.0 | 4 | 3 | 3 | 3.42 |
| Ex. 120 | 97 | 3 | 4 | — | — | — | — | — | 50 | 50 | — | 30.0 | 3 | 4 | 4 | 0.61 |
| Ex. 121 | 97 | 3 | 4 | — | — | — | — | — | 50 | 50 | — | 35.0 | 3 | 4 | 4 | 1.01 |
| Ex. 122 | 97 | 3 | 4 | — | — | — | — | — | 50 | 50 | — | 40.0 | 3 | 5 | 4 | 1.91 |
| Ex. 123 | 97 | 3 | 4 | — | — | — | — | — | 50 | 50 | — | 42.5 | 3 | 5 | 3 | 2.26 |
| Ex. 124 | 97 | 3 | 4 | — | — | — | — | — | 50 | 50 | — | 45.0 | 3 | 4 | 3 | 2.45 |
| Ex. 125 | 97 | 3 | 4 | — | — | — | — | — | 50 | 50 | — | 50.0 | 3 | 4 | 3 | 2.81 |
| Ex. 126 | 97 | 3 | 4 | — | — | — | — | — | 50 | 50 | — | 65.0 | 3 | 4 | 3 | 3.01 |
| Ex. 127 | 97 | 3 | 4 | — | — | — | — | — | 50 | 50 | — | 70.0 | 3 | 3 | 3 | 3.21 |

Note)
C8: caprylic acid, C10: capric acid, C12: lauric acid, C14: myristic acid, C16: palmitic acid, C18: stearic acid, C18F-1: oleic acid.
The components of the constituting fatty acids are expressed by % by mol of the raw materials.

TABLE 16

| | Poly-lactic Acid Amount (% by mass) | Polyglycerol Fatty Acid Ester | | | | | | | | Esterification Ratio (%) | Properties | | | |
|---|---|---|---|---|---|---|---|---|---|---|---|---|---|---|
| | | Amount (% by mass) | Polyglycerol Average Degree of Polymerization | Fatty Acid (% by mol) | | | | | | | Bleeding Property | Injection-Molding Property | Finish of Molded Article | Energy (J) at 50% Fracture |
| | | | | C8 | C10 | C12 | C14 | C16 | C18 | C18F-1 | | | | | |
| Ex. 128 | 97 | 3 | 4 | — | — | — | — | — | — | 100 | 30.0 | 3 | 4 | 4 | 0.51 |
| Ex. 129 | 97 | 3 | 4 | — | — | — | — | — | — | 100 | 35.0 | 3 | 4 | 4 | 0.80 |
| Ex. 130 | 97 | 3 | 4 | — | — | — | — | — | — | 100 | 40.0 | 3 | 4 | 4 | 1.00 |
| Ex. 131 | 97 | 3 | 4 | — | — | — | — | — | — | 100 | 45.0 | 3 | 5 | 4 | 2.01 |
| Ex. 132 | 97 | 3 | 4 | — | — | — | — | — | — | 100 | 50.0 | 3 | 4 | 3 | 2.34 |
| Ex. 133 | 97 | 3 | 4 | — | — | — | — | — | — | 100 | 65.0 | 3 | 4 | 3 | 2.52 |
| Ex. 134 | 97 | 3 | 4 | — | — | — | — | — | — | 100 | 70.0 | 3 | 3 | 3 | 2.81 |
| Ex. 135 | 97 | 3 | 4 | — | — | 14 | 6 | 34 | 26 | 20 | 66.0 | 3 | 3 | 3 | 3.20 |

Note)
C8: caprylic acid, C10: capric acid, C12: lauric acid, C14: myristic acid, C16: palmitic acid, C18: stearic acid, C18F-1: oleic acid.
The components of the constituting fatty acids are expressed by % by mol of the raw materials.

TABLE 17

| | Polylactic Acid Amount (% by mass) | Polyglycerol Fatty Acid Ester | | | | | | | | | Properties | | | |
|---|---|---|---|---|---|---|---|---|---|---|---|---|---|---|
| | | Amount (% by mass) | Polyglycerol Average Degree of Polymerization | Fatty Acid (% by mol) | | | | | | Esterification Ratio (%) | Bleeding Property | Injection-Molding Property | Finish of Molded Article | Energy (J) at 50% Fracture |
| | | | | C8 | C10 | C12 | C14 | C16 | C18 | C18F-1 | | | | |
| Ex. 136 | 97 | 3 | 10 | — | 100 | — | — | — | — | — | 50.0 | 4 | 4 | 4 | 0.58 |
| Ex. 137 | 97 | 3 | 10 | — | 100 | — | — | — | — | — | 65.0 | 4 | 4 | 4 | 1.02 |
| Ex. 138 | 97 | 3 | 10 | — | 100 | — | — | — | — | — | 78.0 | 4 | 5 | 4 | 2.50 |
| Ex. 139 | 97 | 3 | 10 | — | 100 | — | — | — | — | — | 90.0 | 4 | 4 | 3 | 3.19 |
| Ex. 140 | 97 | 3 | 10 | — | 100 | — | — | — | — | — | 100.0 | 4 | 3 | 3 | 3.32 |
| Ex. 141 | 97 | 3 | 10 | — | — | 100 | — | — | — | — | 60.0 | 3 | 3 | 3 | 2.70 |
| Ex. 142 | 97 | 3 | 10 | — | — | — | — | 50 | 50 | — | 35.0 | 4 | 5 | 4 | 1.96 |
| Ex. 143 | 97 | 3 | 10 | — | — | — | — | — | — | 100 | 61.0 | 3 | 4 | 3 | 2.01 |

Note)
C8: caprylic acid, C10: capric acid, C12: lauric acid, C14: myristic acid, C16: palmitic acid, C18: stearic acid, C18F-1: oleic acid.
The components of the constituting fatty acids are expressed by % by mol of the raw materials.

TABLE 18

| | Polylactic Acid Amount (% by mass) | Modifying Agent for Polylactic Acid-Based Resin | | Properties | | | |
|---|---|---|---|---|---|---|---|
| | | Amount (% by mass) | Kinds | Bleeding Property | Injection-Molding Property | Finish of Molded Article | Energy (J) at 50% Fracture |
| Comp. Ex. 11 | 100 | 0 | — | 4 | 5 | 4 | 0.25 |
| Comp. Ex. 12 | 95 | 5 | Plamate PD-150 | 4 | 5 | 4 | 0.27 |
| Comp. Ex. 13 | 88 | 12 | DAIFATTY-101 | 1 | 4 | 2 | 3.19 |
| Comp. Ex. 14 | 90 | 10 | PARALOID BPM-500 | 4 | 5 | 4 | 0.45 |

The following matters can be confirmed from the above results. Here, Tables 1 and 12 to 16 show the test results of Examples of the polyglycerol fatty acid esters of Embodiment 1; Tables 2 to 6 and 17 show those of the polyglycerol fatty acid esters of Embodiment 2; and Tables 7 to 9 show those of the polyglycerol fatty acid esters of Embodiment 3.

It can be seen from Tables 2 to 6 that as the structures of the polyglycerol fatty acid esters of Embodiment 2, in the case where the degree of polymerization of polyglycerol and the kinds of the fatty acids are identical, the higher the esterification ratio, the higher the impact properties as compared to the polylactic acid alone. Specifically, when Examples 9 to 15 are compared, all these using a polyglycerol fatty acid ester of which polyglycerol has an average degree of polymerization of 10 and the fatty acids composed of stearic acid and palmitic acid in equal amounts (50:50), only an esterification ratio being different from each other, the polyglycerol fatty acid ester being added in an amount of 3% by mass to the polylactic acid, Example 15 where an esterification ratio is 60.0% has high impact properties. Also, Examples 11 to 14 where esterification ratios are from 30.0 to 50.0% are excellent in both molding processability and impact properties. In order to satisfy both molding processability and impact properties, an appropriate esterification ratio is needed.

In cases of oleic acid or lauric acid, it can be seen that the higher the esterification ratio, the higher the impact properties as compared to that of the polylactic acid alone. Specifically, when Examples 20 to 22 (in the case of lauric acid) are compared, it can be seen that Example 22 having a higher esterification ratio has higher impact properties than those of Examples 20 and 21. On the other hand, in Examples 20 and 21 it is possible to satisfy both molding processability and impact properties. In addition, the same phenomena are found also from Examples 23 to 30 (in the case of oleic acid), and Examples 26 to 29 having esterification ratios of from 30.0 to 65.0% can satisfy both molding processability and impact properties.

Of the structures of the polyglycerol fatty acid esters, as the constituting fatty acids, it can be seen that the fatty acids in which stearic acid is combined with palmitic acid are more preferred because they show more excellent impact properties than a case where stearic acid or palmitic acid is used alone. Specifically, when Examples 5 and 7 are compared with Example 12, it can be confirmed that the polyglycerol fatty acid ester comprising a combination of palmitic acid and stearic acid has more excellent molding processability than that of the polyglycerol fatty acid ester comprising palmitic acid or stearic acid alone, so that the polyglycerol fatty acid ester of combined acids show even more excellent impact properties.

When Example 27 is compared with Examples 34 and 39, although impact properties are enhanced even in Example 27 where oleic acid alone is used, it can be seen that Example 39 where oleic acid is used together with stearic acid, or Example 34 where oleic acid is used together with stearic acid and palmitic acid has even higher impact properties. Furthermore, Examples 34 and 39 have favorable molding processability.

In Example 21 and Examples 41 and 43, although sufficiently excellent impact properties are shown even in Example 21 where lauric acid alone is used, it can be confirmed that Example 41 in which lauric acid and stearic acid are combined and Example 43 where lauric acid, palmitic acid, and stearic acid have even more excellent impact properties than a case where lauric acid is used alone.

In addition, it can be seen from the results of Tables 7 to 9 that in the same manner as the results of Embodiment 2, as the structure of the polyglycerol fatty acid esters of Embodiment 3, in the case where the degree of polymerization of polyglycerol and the kinds of the fatty acids are identical, the higher the esterification ratio, the higher the impact properties as compared to the polylactic acid alone. Specifically, when Examples 56 to 60 are compared, all of which are polyglycerol fatty acid esters of which average degree of polymerization is 38 and fatty acids being composed of stearic acid and palmitic acid in equal amounts (50:50), with the esterification ratio only being different, the polyglycerol fatty acid being added in an amount of 3% by mass of polylactic acid, Example 60 having an esterification ratio of 60.0% has high impact properties. In addition, Examples 57 to 59 where esterification ratios are from 30.0 to 50.0% are excellent in both molding processability and impact properties. In order to satisfy both molding processability and impact properties, an appropriate esterification ratio is needed.

In addition, of the structures of the polyglycerol fatty acid esters, it can be seen that those of which glycerol moiety is not monoglycerol but a polyglycerol have more excellent impact properties. Specifically, when Examples 1, 4, 12, and 58 are compared with Comparative Example 2, these polyglycerol fatty acid esters having the same components of the fatty acids and esterification ratios, and the amount of the ester added to the polylactic acid-based resin being the same, it can be seen that Examples 1, 4, 12, and 58 having high degrees of polyglycerol have excellent impact properties, whereas Comparative Example 2 where monoglycerol is used has worsened impact properties than those of the polylactic acid alone.

The properties in cases where additives other than the polyglycerol fatty acid esters of the present invention are used are shown in Comparative Examples 5 to 10. The additives used in Comparative Examples 5 to 10 are marketed manufactured articles, and it can be seen in Comparative Examples 5 to 10 that although the polyglycerol fatty acid esters have excellent molding processability, they do not have high impact properties. In addition, it can be seen in Comparative Examples 5, 6, and 10 corresponding to the fatty acid esters falling outside the present invention have markedly lowered glass transition temperatures, so that the glycerol fatty acid esters not only have worsened impact properties, but also have disadvantages in thermal properties.

Further, the followings can be seen from the results of Tables 12 to 18. The additives used in Comparative Examples 12, 13, and 14 are already marketed manufactured articles, and it can be seen in Comparative Examples 12 and 14 that although the fatty acid esters have excellent molding processability, none of them have high impact properties even when the amount is large. In Comparative Example 13, although the fatty acid ester has excellent impact properties, its molding processability is low. By contrast, it can be confirmed that the polyglycerol fatty acid esters of the present invention have excellent molding processability and dramatically enhanced impact properties. As the structure of the polyglycerol fatty acid esters, in the case where the degree of polymerization of polyglycerol and the kinds of the fatty acids are identical, the higher the esterification ratio, the higher the impact properties as compared to the polylactic acid alone. Specifically, when Examples 85 to 92 are each compared, the case where stearic acid and palmitic acid are being added in equal amounts (50:50), it can be seen that the higher the esterification ratio, the higher the impact properties. In Examples 86 to 91, it can be seen that the polyglycerol fatty acid esters are excellent in both molding processability and impact properties, and in order to satisfy both molding processability and impact properties, an appropriate esterification ratio is needed. In addition, Examples 109 to 111 where lauric acid, myristic acid, palmitic acid, stearic acid, and oleic acid are used in combination, and esterification ratios are from 40.0 to 80.0% are excellent in both molding processability and impact properties.

Also, FIG. 1 shows an SEM photograph of polylactic acid (Comparative Example 1), FIG. 2 shows an SEM photograph of Example 12, and FIG. 3 shows an SEM photograph of Example 27. As is clear from the comparison of FIG. 1 with FIGS. 2 and 3, it can be confirmed that the polyglycerol fatty acid ester is finely dispersed to form islands in polylactic acid to provide a so-called sea-island structure.

INDUSTRIAL APPLICABILITY

The polylactic acid-based resin composition containing an impact resistance enhancing agent for a polylactic acid-based resin of the present invention has excellent impact resistance properties, so that the resin composition can be suitably used in, for example, agricultural materials, food wrapping materials, and other wrapping materials, and the like.

The invention claimed is:

1. An impact resistance enhancing agent for a polylactic acid-based resin, comprising a polyglycerol fatty acid ester having an esterification ratio of from 30 to 45%, the polyglycerol fatty acid ester made from
    a fatty acid comprising at least one member selected from the group consisting of caprylic acid, capric acid, lauric acid, myristic acid, palmitic acid, stearic acid, and oleic acid, in an amount of 80% by mass or more of the constituting fatty acids, and
    a polyglycerol having an average degree of polymerization of from 2 to 4.

2. The impact resistance enhancing agent for a polylactic acid-based resin according to claim 1, wherein the fatty acid comprises at least three members selected from the group consisting of caprylic acid, capric acid, lauric acid, myristic acid, palmitic acid, stearic acid, and oleic acid, in an amount of 80% by mass or more of the constituting fatty acids.

3. The impact resistance enhancing agent for a polylactic acid-based resin according to claim 1, wherein the fatty acid comprises lauric acid in an amount of 85% by mass or more of the constituting fatty acids, and wherein the esterification ratio is from 40 to 45%.

4. The impact resistance enhancing agent for a polylactic acid-based resin according to claim 1, wherein the fatty acid comprises palmitic acid and/or stearic acid in an amount of 85% by mass or more of the constituting fatty acids.

5. The impact resistance enhancing agent for a polylactic acid-based resin according to claim 1, wherein the fatty acid comprises oleic acid in an amount of 80% by mass or more of the constituting fatty acids.

6. An impact resistance enhancing agent for a polylactic acid-based resin, comprising a polyglycerol fatty acid ester having an esterification ratio of from 5 to 45%, the polyglycerol fatty acid ester made from a fatty acid comprising at least one member selected from the group consisting of caprylic acid, capric acid, lauric acid, myristic acid, palmitic acid, stearic acid, and oleic acid, in an amount of 80% by mass or more of the constituting fatty acids, and a polyglycerol having an average degree of polymerization of from 5 to 10.

7. The impact resistance enhancing agent for a polylactic acid-based resin according to claim 6, wherein the fatty acid comprises (i) lauric acid and palmitic acid, (ii) lauric acid and stearic acid, or (iii) lauric acid, palmitic acid, and stearic acid, in an amount of 80% by mass or more of the constituting fatty acids.

8. The impact resistance enhancing agent for a polylactic acid-based resin according to claim 6, wherein the fatty acid comprises oleic acid in an amount of 80% by mass or more of the constituting fatty acids.

9. The impact resistance enhancing agent for a polylactic acid-based resin according to claim 6, wherein the fatty acid comprises palmitic acid and/or stearic acid in an amount of 85% by mass or more of the constituting fatty acids.

10. The impact resistance enhancing agent for a polylactic acid-based resin according to claim 6, wherein the fatty acid comprises (i) palmitic acid and oleic acid, (ii) stearic acid and oleic acid, or (iii) palmitic acid, stearic acid, and oleic acid, in an amount of 80% by mass or more of the constituting fatty acids.

11. An impact resistance enhancing agent for a polylactic acid-based resin, comprising a polyglycerol fatty acid ester having an esterification ratio of from 5 to 80%, the polyglycerol fatty acid ester made from a fatty acid comprising at least one member selected from the group consisting of caprylic acid, capric acid, lauric acid, myristic acid, palmitic acid, stearic acid, and oleic acid, in an amount of 80% by mass or more of the constituting fatty acids, and a polyglycerol having an average degree of polymerization of from 11 to 40.

12. The impact resistance enhancing agent for a polylactic acid-based resin according to claim 11, wherein the fatty acid comprises at least one member selected from the group consisting of caprylic acid, capric acid, and lauric acid, in an amount of 85% by mass or more of the constituting fatty acids, and wherein the esterification ratio is from 30 to 80%.

13. The impact resistance enhancing agent for a polylactic acid-based resin according to claim 11, wherein the fatty acid comprises at least one member selected from the group consisting of myristic acid, palmitic acid, stearic acid, and oleic acid, in an amount of 80% by mass or more of the constituting fatty acids, and wherein the esterification ratio is from 5 to 60%.

14. A polylactic acid-based resin composition characterized in that the polylactic acid-based resin composition comprises a polylactic acid-based resin and the impact resistance enhancing agent as defined in claim 1.

15. A polylactic acid-based resin composition characterized in that the polylactic acid-based resin composition comprises a polylactic acid-based resin and the impact resistance enhancing agent as defined in claim 6.

16. A polylactic acid-based resin composition characterized in that the polylactic acid-based resin composition comprises a polylactic acid-based resin and the impact resistance enhancing agent as defined in claim 11.

17. The impact resistance enhancing agent for polylactic acid-based resin of claim 1, wherein the polyglycerol fatty acid is one or more selected from the group consisting of myristic acid, palmitic acid, stearic acid and oleic acid.

18. The impact resistance enhancing agent for polylactic acid-based resin of claim 6, wherein the polyglycerol fatty acid is one or more selected from the group consisting of lauric acid, palmitic acid, stearic acid and oleic acid.

* * * * *